United States Patent
Mori et al.

(10) Patent No.: US 12,360,699 B2
(45) Date of Patent: Jul. 15, 2025

(54) MEMORY SYSTEM

(71) Applicant: Kioxia Corporation, Tokyo (JP)

(72) Inventors: Haruka Mori, Kawasaki Kanagawa (JP); Mitsunori Tadokoro, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/586,342

(22) Filed: Feb. 23, 2024

(65) Prior Publication Data

US 2024/0311039 A1    Sep. 19, 2024

(30) Foreign Application Priority Data

Mar. 13, 2023    (JP) ................................ 2023-038661

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC .... G06F 3/0655; G06F 3/0604; G06F 3/0673; G06F 3/061; G06F 3/0659; G06F 3/0679; G06F 3/0688; G06F 13/1668; G06F 13/1605
See application file for complete search history.

(56) References Cited

U.S. PATENT DOCUMENTS

| | | | |
|---|---|---|---|
| 6,581,111 B1 | 6/2003 | Lakhanpal et al. | |
| 7,506,114 B2 | 3/2009 | Haga et al. | |
| 10,606,750 B1* | 3/2020 | Mattina | G06F 12/122 |
| 2020/0401440 A1* | 12/2020 | Sankaran | G06F 9/3887 |
| 2021/0303206 A1* | 9/2021 | Saxena | G06F 3/0604 |
| 2022/0253248 A1 | 8/2022 | Yoon et al. | |
| 2022/0359488 A1* | 11/2022 | Yu | H01L 21/6835 |
| 2023/0359488 A1* | 11/2023 | Eeckhout | G06F 9/30043 |

* cited by examiner

*Primary Examiner* — John A Lane
(74) *Attorney, Agent, or Firm* — Kim & Stewart LLP

(57) ABSTRACT

A memory system includes a plurality of memory chips, a memory, and a controller. The memory chips are capable of operating in parallel. The memory includes a physical channel region and a plurality of virtual channel regions, each corresponding to one of a plurality of processes executed on the memory chips according to the requests. The controller stores the requests issued from the host in the physical channel region in order of acquisition from the host, and an entry for each of the requests in one of the virtual channel regions. When a required degree of parallelism of the processes is less than a threshold, the controller selects a next request to be executed using the physical channel region. When the required degree of parallelism is greater than or equal to the threshold, the controller selects a next request to be executed using one of the virtual channel regions.

18 Claims, 16 Drawing Sheets

MEMORY SYSTEM

CROSS-REFERENCE TO RELATED APPLICATION(S)

This application is based upon and claims the benefit of priority from Japanese Patent Application No. 2023-038661, filed Mar. 13, 2023, the entire contents of which are incorporated herein by reference.

FIELD

Embodiments described herein relate generally to a memory system.

BACKGROUND

In recent years, memory systems including storage devices such as nonvolatile memories have become widespread. As one of the memory systems, for example, a solid state drive (SSD) including a NAND flash memory is known. SSDs are used as the main storage for various computing devices.

Memory systems execute processes such as data writing or data reading on storage devices in response to requests (for example, also called commands) issued by hosts. In a memory system, in order to maintain data coherency, the order of a plurality of requests issued by hosts is maintained, for example, by a memory that has a first-in first-out (FIFO) structure (FIFO memory).

A storage device of a memory system includes a plurality of memory chips capable of executing operations in parallel. For example, in a data center and a dedicated enterprise product, parallelism of the operations of the memory chips has tended to increase.

In such a memory system, when it is not necessary to ensure a process which follows an original order of requests from hosts (an in-order process) and performance of the memory system can be improved because of simultaneous execution of independent requests, a plurality of FIFO memories associated for each plurality of processes which can be executed in parallel are provided in some cases. The requests from the hosts are stored in a FIFO memory associated with corresponding processes in the plurality of FIFO memories. Accordingly, the order of the requests in each of the plurality of processes is reconstructed. Since processes in response to the requests stored in each FIFO memory can be executed in parallel, performance of the memory system can be improved if it is not necessary to follow a strict order.

When the order of requests in a plurality of processes is reconstructed, information regarding the original order of the requests by a host is lost. This means that the requests are changed from an in-order process to a process which does not follow the original order of the requests (out-of-order process) at a time point at which the requests are stored in a plurality of FIFO memories associated in the plurality of processes which can be executed in parallel.

In the out-of-order process, efficiency of a process in a memory system may deteriorate due to worsening of the latency of response to a request (due to undue waiting for the process of a precedent request) and by reducing the efficiency of resource utilization in the memory system that assumes an in-order process. Accordingly, improvements in the efficiency of the out-of-order process are needed.

DETAILED DESCRIPTION

Embodiments provide a memory system capable of improving efficiency of a process.

In general, according to one embodiment, a memory system includes a plurality of memory chips, a random access memory, and a controller. The plurality of memory chips are capable of operating in parallel. The random access memory includes a physical channel region in which requests issued from a host are stored and a plurality of virtual channel regions, each of which corresponds to one of a plurality of processes executed on the plurality of memory chips according to the one or more requests. The controller stores the requests issued from the host in the physical channel region in order of acquisition from the host. The controller stores an entry for each of the requests in one of the plurality of virtual channel regions. When a required degree of parallelism of the plurality of processes is less than a predetermined threshold, the controller selects a next request to be executed using the physical channel region. When the required degree of parallelism is greater than or equal to the predetermined threshold, the controller selects a next request to be executed using one of the plurality of virtual channel regions.

Hereinafter, embodiments will be described with reference to the drawings.

Figure 1:
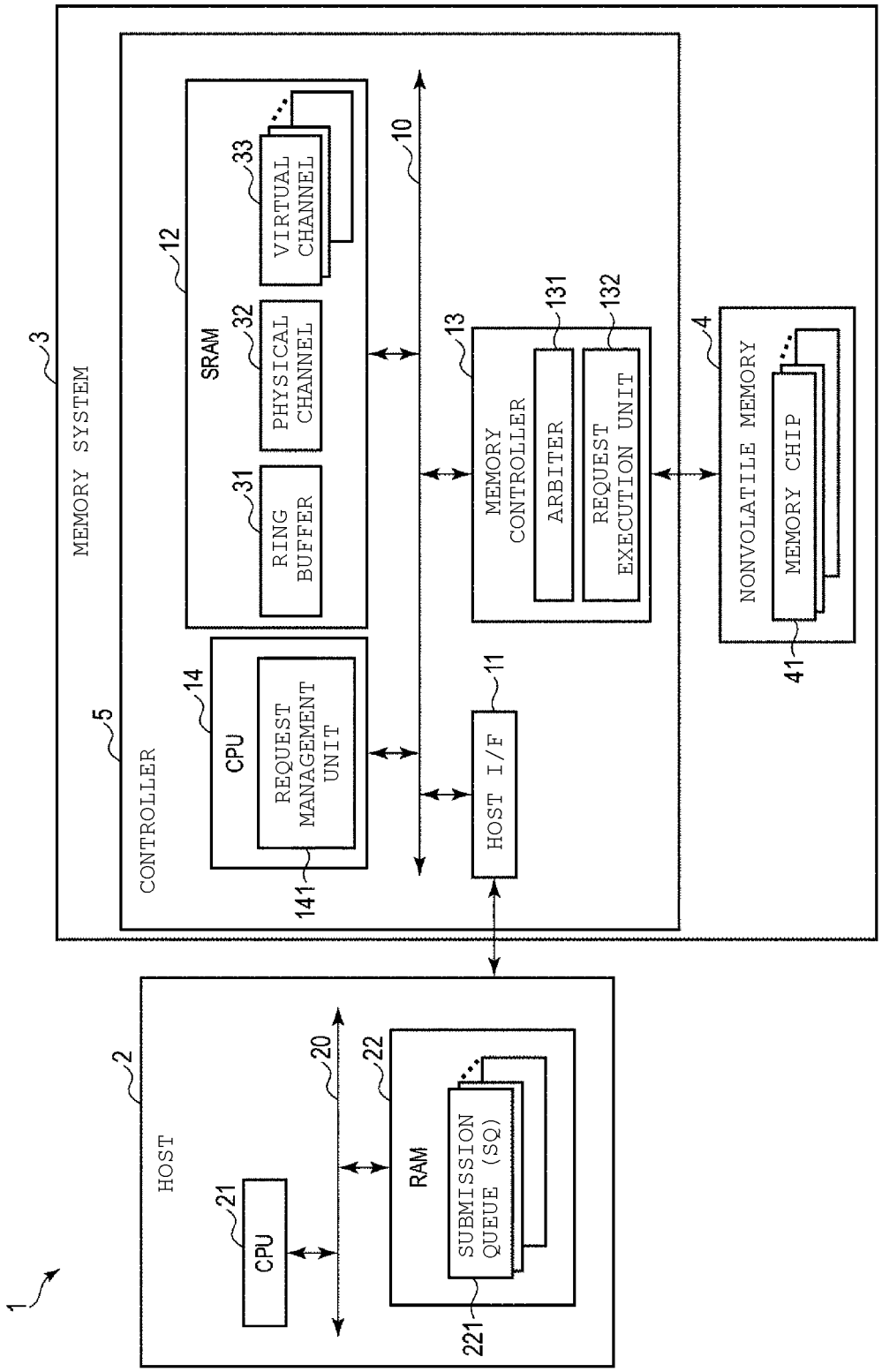
FIG. 1 is a block diagram illustrating a configuration example of an entire information processing system in which a memory system and a host are connected according to an embodiment.

FIG. 1 is a block diagram illustrating a configuration example of an entire information processing system in which a memory system and a host are connected according to the embodiment. An information processing system 1 includes, for example, a host device 2 and a memory system 3. Hereinafter, the host device 2 is also referred to as a host 2.

The host device 2 may be a storage server that stores many and diverse types of data in the memory system 3 or may be a personal computer.

The memory system 3 is, for example, a semiconductor storage device configured to write data in a nonvolatile memory and read data from the nonvolatile memory. The nonvolatile memory is, for example, a NAND flash memory. The memory system 3 is also referred to as a storage device. The memory system 3 is implemented as, for example, a solid state drive (SSD) that includes a NAND flash memory.

The memory system 3 can be used as a storage of the host 2. The memory system 3 may be built in the host 2 or may be connected to the host 2 via a cable or a network.

An interface connecting the host 2 to the memory system 3 conforms with a standard such as SCSI, serial attached SCSI (SAS), ATA, serial ATA (SATA), PCI Express® (PCIe®), Ethernet®, Fibre channel, or NVM Express® (NVMe®).

A configuration example of each of the host 2 and the memory system 3 will be described below.

Configuration Example of Host 2

The host 2 includes, for example, a central processing unit (CPU) 21 and a random access memory (RAM) 22. The CPU 21 and the RAM 22 are connected via, for example, a bus 20. The bus 20 is connected to an interface (not illustrated) provided in the host 2. The interface is connected to a host interface 11 in a controller of the memory system 3, that is described below, and enables information to be transmitted and received between the host 2 and the memory system 3.

The CPU 21 is, for example, at least one processor. The CPU 21 controls operations of various components in the host 2.

The RAM 22 is a volatile memory. The RAM 22 is implemented as, for example, a dynamic RAM (DRAM) or a static RAM (SRAM).

The host 2 includes a plurality of submission queues 221. To each of the plurality of submission queues 221, for example, a storage region of the RAM 22 is allocated. The submission queue 221 is a queue that stores requests issued to the memory system 3 by the host 2 (more specifically, the CPU 21). That is, the host 2 transmits requests to the memory system 3 via the submission queue 221. The request is, for example, a command.

Configuration Example of Memory System 3

The memory system 3 includes, for example, a nonvolatile memory 4 and a controller 5. The memory system 3 may include a dynamic random access memory (DRAM).

The nonvolatile memory 4 includes a plurality of memory chips 41. Each of the plurality of memory chips 41 includes a plurality of blocks each including a plurality of memory cells disposed in a matrix form. One block functions as a minimum unit for a data erasing operation. The block is also referred to as an "erasing block" or a "physical block" in some cases. Each of the plurality of blocks includes a plurality of pages. Each of the plurality of pages includes a plurality of memory cells connected to a single word line. One page functions as a unit for a data write operation and a data read operation. A word line may function as a unit for a data write operation and a data read operation.

The number of program/erasing cycles (the number of P/E cycles) for each block has an upper limit which is referred to as a maximum number of P/E cycles. One P/E cycle of a certain block includes an erasing operation for causing all the memory cells in the block to enter an erasing state and a write operation of writing data in each page of the block.

The controller 5 can be implemented by a circuit such as a system-on-a-chip (SoC). The controller 5 is configured to control the nonvolatile memory 4.

The controller 5 may function as a flash translation layer (FTL) configured to execute data management and block management of the nonvolatile memory 4. The data management executed by the FTL includes (1) management of mapping information indicating a correspondent relation between each logical address and each physical address of the nonvolatile memory 4 and (2) a process of concealing a difference between a read/write operation in units of pages and an erase operation in units of blocks. The block management includes management of defective blocks, wear leveling, and garbage collection.

A logical address is used for the host 2 to designate an address for a storage region of the memory system 3. The logical address is, for example, a logical block address (LBA).

The management of mapping between each logical address and each physical address is executed using, for example, a logical-to-physical address conversion table. The controller 5 manages mapping between each logical address and each physical address in units of specific management sizes using the logical-to-physical address conversion table. A physical address corresponding to a certain logical address indicates a physical storage position in the nonvolatile memory 4 in which data of the logical address is written. The controller 5 manages a plurality of storage regions into which the nonvolatile memory 4 is logically divided using the logical-to-physical address conversion table. The plurality of storage regions correspond to a plurality of logical addresses, respectively. That is, each of the plurality of storage regions is specified with one logical address. The logical-to-physical address conversion table may be loaded from the nonvolatile memory 4 to the DRAM when the memory system 3 starts up.

Writing of data in one page can be executed only once per P/E cycle. Therefore, the controller 5 writes update data corresponding to a certain logical address not in the same physical storage position at which data is stored but in another physical storage position. The controller 5 invalidates previous data by updating the logical-to-physical address conversion table so that the logical address is associated with the other physical storage position. Data that is referred to in the logical-to-physical address conversion table (that is, data that is associated with the logical address) is referred to as valid data. Data that is not associated with any logical address is referred to as invalid data. The valid data is data that is likely to be read in response to a request from the host 2 later. The invalid data is data that is not likely to be read in response to a request from the host 2 any more.

The controller 5 includes, for example, a host interface (host I/F) 11, an SRAM 12, a memory controller 13, and a CPU 14. The host I/F 11, the SRAM 12, the memory controller 13, and the CPU 14 are connected via, for example, a bus 10.

The host I/F 11 functions as a control circuit that controls communication between the host 2 and the memory system 3. The host I/F 11 receives requests (commands) of various processes from the host 2 (more specially, the submission queue 221). The requests of processes received from the host 2 are, for example, an input/output (I/O) request and various control requests. The I/O request includes, for example, a write request and a read request. The control requests include, for example, a trim request (un-map request), an abort request, and a flush request. The host I/F 11 receives data from the host 2. The data received from the host 2 is, for example user data to be written in the nonvolatile memory 4 in response to a write request.

The SRAM 12 is a volatile memory. A storage region of the SRAM 12 is allocated as, for example, a ring buffer 31, a physical channel 32, and a plurality of virtual channels 33.

The ring buffer 31 is, for example, a read buffer and/or a write buffer. The read buffer is a storage region in which user data read from the nonvolatile memory 4 is temporarily stored in response to a read request from the host 2. The write buffer is a storage region in which user data to be written in the nonvolatile memory 4 is temporarily stored in response to a write request from the host 2.

The physical channel 32 is, for example, a storage region in which one or more requests are stored. More specifically, in the physical channel, for example, one or more requests and the storage order of the one or more requests may be stored. The physical channel 32 has, for example, a data structure implemented by a link list. All the requests acquired from the submission queue 221 of the host 2 are physically stored in the physical channel 32 in the order of acquisition from the submission queue 221. Physically storing a request in a channel means storing the request itself (that is, a substance of a request) in the channel.

Each of the plurality of virtual channels 33 is a storage region in which one or more requests can be stored. More specifically, in each of the plurality of virtual channels 33, one or more requests and the storage order of the one or more requests may be stored. Alternatively, in each of the plurality of virtual channels 33, reference to one or more requests and the order of the one or more requests may be stored. The number of virtual channels 33 provided in the memory system 3 corresponds to, for example, the number of processes that can be executed in parallel in the nonvolatile memory 4. In each virtual channel 33, for example, one or more requests are managed by a FIFO scheme. Each virtual channel 33 has, for example, a data structure implemented by a link list. A request acquired from the submission queue 221 of the host 2 is physically stored in or virtually stored in (i.e., assigned to) any one of the plurality of virtual channels 33. Virtually storing a request in a channel means storing information for referring to the request in a channel with reference to the request. The information for referring to the request is, for example, information indicating a storage position inside the physical channel 32 in which the the request is stored.

One request is stored in the physical channel 32 and is stored in any one of the plurality of virtual channels 33. The physical channel 32 and the virtual channel 33 have a data structure in which the one request stored in both the physical channel and the virtual channel has an association between the virtual channel and the physical channel. More specifically, for example, one request is physically stored in the physical channel 32 and is virtually stored in any one of the plurality of virtual channels 33. The physical channel 32 and the virtual channel 33 have a data structure in which the physically stored requests and the virtually stored requests can be associated with each other.

Hereinafter, a case in which requests are physically stored in the physical channels 32 and requests are virtually stored in the virtual channels 33 will be given as an example. Requests may be physically stored in both the physical channels 32 and the virtual channels 33. A specific example of structures of the physical channels 32 and the virtual channels 33 will be described with reference to FIGS. 3 to 16.

The memory controller 13 electrically connects the controller 5 to the nonvolatile memory 4. The memory controller 13 conforms to an interface standard such as a toggle DDR or an open NAND flash interface (ONFI).

The memory controller 13 is a control circuit configured to control the nonvolatile memory 4. The memory controller 13 may be connected to each of the plurality of memory chips 41 of the nonvolatile memory 4 via a plurality of channels. The plurality of memory chips 41 are driven in parallel so that the access bandwidth between the controller 5 and the nonvolatile memory 4 can be widened.

The memory controller 13 includes an arbiter 131 and a request execution unit 132.

The arbiter 131 selects one channel from the physical channel 32 and the plurality of virtual channels 33 by arbitration and executes an operation of acquiring requests from the head of the selected channel. Hereinafter, this operation is also referred to as an arbitration operation.

Specifically, for example, when the degree of flexibility of parallel process management (defined below) is equal to or greater than a threshold, the arbiter 131 selects the physical channel 32. Conversely, when the degree of freedom of parallel process management is less than the threshold, the arbiter 131 selects one virtual channel 33 corresponding to an executable process from the plurality of virtual channels 33.

Here, the parallel process management is management of a plurality of processes that can be executed in parallel in the memory system 3. The arbiter may impose some restrictions on the parallel process management to satisfy a requirement specification. The restriction imposed on the parallel process management is expressed as, for example, an index indicating the required amount of parallelism to be implemented. The index also indicates the inverse of the required amount of parallelism, which is referred to herein as the degree of flexibility of the parallel process management. Thus, if the required amount is high, the degree of flexibility is low. Specifically, the degree of flexibility of the parallel process management is based on the number of processes or a ratio of processes are required to be executed in parallel among the plurality of processes. For example, when sixteen processes can be executed in parallel in the memory system 3 and only two processes are required to be executed in parallel, the degree of flexibility of the parallel process management can be said to be high. On the other hand, when four processes can be executed in parallel in the memory system 3 and four processes are required to be executed in parallel, the degree of flexibility of the parallel process management can be said to be low. The degree of flexibility of the parallel process management is determined according to a specification for the memory system 3 (for example, a configuration of the memory system 3, performance required in the memory system 3, or the like). Instead of the degree of flexibility of the parallel process management, the degree of restriction imposed on the parallel process management, referred to herein as the required degree of parallelism, may be used. When the degree of flexibility of the parallel process management is high, the required degree of parallelism is low. When the degree of flexibility of the parallel process management is low, the required degree of parallelism is high.

When the physical channel 32 is selected by arbitration, the arbiter 131 physically acquires the request from the head of the physical channel 32. The physical acquisition of the request from the physical channel 32 means acquisition of the request itself from the physical channel 32. When one virtual channel 33 is selected by arbitration, the arbiter 131 virtually acquires the request from the head of the virtual channel 33. The virtual acquisition of the request from the virtual channel 33 means acquisition of information indicating a storage position in the physical channel 32 in which the request is stored from the virtual channel 33 and acquisition of the request from the physical channel 32 based on the acquired information. In a case in which the request is also physically stored in the virtual channel 33, the arbiter 131 physically acquires the request from the head of the virtual channel 33. The arbiter 131 transmits the acquired request to the request execution unit 132.

The request execution unit 132 executes a process in response to the request received from the arbiter 131. For example, when the received request is a write request, the request execution unit 132 executes a data write operation of writing user data in the memory chip 41. For example, when the received request is a read request, the request execution unit 132 executes a data read operation of reading user data from the memory chip 41.

Specific examples of operations executed by the arbiter 131 and the request execution unit 132 will be described below with reference to FIGS. 3 to 16.

The CPU 14 is a processor configured to control the host I/F 11, the SRAM 12, and the memory controller 13. The CPU 14 executes various processes by executing firmware (FW). The FW is a control program including a command group for causing the CPU 14 to execute various processes. The CPU 14 can execute a requesting process or the like of processing various requests from the host 2. The operation of the CPU 14 is controlled by the FW executed by the CPU 14.

A function of each unit in the controller 5 may be implemented by dedicated hardware in the controller 5 or may be implemented by causing the CPU 14 to execute the FW.

The CPU 14 functions as, for example, a request management unit 141. The CPU 14 functions as the request management unit 141, for example, by executing the FW.

The request management unit 141 executes an operation of storing requests acquired (more specifically, fetched) from the submission queue 221 of the host 2 via the host I/F 11 in any one of the physical channel 32 and the plurality of virtual channels 33. An operation of newly storing the requests acquired from the submission queue 221 in any one of the physical channel 32 and the plurality of virtual channels 33 is also referred to as an enqueue operation. In the enqueue operation, the request acquired from the submission queue 221 is physically stored in the physical channel 32 and is virtually stored in one virtual channel 33 selected from the plurality of virtual channels 33. In some embodiments, the request may also be physically stored in the selected one virtual channel 33.

The request management unit 141 executes an operation of deleting a request from the physical channel 32 and the virtual channels 33 according to acquisition of the request from any one channel of the physical channel 32 and the virtual channels 33 and execution of a process corresponding to the acquired request. An operation of deleting the request from the physical channel 32 and the virtual channels 33 is also referred to as a dequeue operation. In the dequeue operation, a request on which a corresponding process is executed is deleted, for example, from both the physical channel 32 in which the request is physically stored and the virtual channel 33 in which the request is virtually stored. In the embodiments where a request is also stored in the virtual channel 33, the request on which a corresponding process is executed is deleted from the virtual channel 33 in which the request is physically stored.

A specific operation example by the request management unit 141 will be described below with reference to FIGS. 3 to 16.

The request management unit 141 may be provided in the memory controller 13. The request execution unit 132 may be provided in the CPU 14. Alternatively, an operation of at least one of the request management unit 141 and the request execution unit 132 may be implemented as an operation in which the CPU 14 and the memory controller 13 cooperate with each other.

Here, an in-order process and an out-of-order process in the memory system 3 will be described.

The in-order process is a process that follows the order of requests acquired from the submission queues 221 of the host 2. In the in-order process, data coherency can be maintained in the host 2 and the memory system 3. The order of the requests acquired from the submission queue 221 of the host 2 is also referred to as an original request order. In the in-order process, for example, when many requests to the single memory chip 41 are acquired consecutively from the submission queue 221, there is a possibility that the operation performance of all the plurality of memory chips 41 will deteriorate. This is because processes cannot be executed in response to requests to the other memory chips 41 until the processes are completed in the original request order in response to many requests to the single memory chip 41. In the in-order process, it is necessary to wait for completion of a process in response to a previous request even when a process can be executed immediately in response to a request to another memory chip 41.

The out-of-order process is a process that does not follow the original request order. In the out-of-order process, the parallel process management is executed. Specifically, in the out-of-order process, a process in response to each request acquired from the submission queue 221 is included in one of the plurality of processes that can be executed in parallel. Since the process in response to each request is executed in parallel to another process as a part of a corresponding process, the process is the out-of-order process that does not follow the original request order. In the out-of-order process, for example, when an operation is not executed on a certain memory chip 41, a plurality of processes are managed so that a process corresponding to the memory chip 41 is executed. Accordingly, since the plurality of processes are executed efficiently, operation performance of all the plurality of memory chips 41 can be improved.

The parallel process management is executed with, for example, a single thread. Therefore, an overhead for arbitration between the plurality of processes is recorded as latency of response to a request from the host 2. Since this arbitration is executed without consideration of the original request order, an adverse influence of the memory system 3 on quality of service (QOS) can occur. Specifically, there is a possibility that this arbitration will deteriorate the latency of a response to a request from the host 2.

When management of resources used for a process in response to a request is assumed to be the in-order process, the resources used for a process in response to a certain request cannot be used despite completion and releasing of the process unless a process in response to a preceding request is completed. The resources which are used in the process in response to the request and in which the in-order process is assumed are, for example, the ring buffer 31. Because the released resources cannot be used, the number of in-flight requests necessary to realize the potential performance of the controller 5 cannot be sufficiently obtained and there is a possibility that the efficiency of a process in the memory system 3 will deteriorate.

Figure 2:
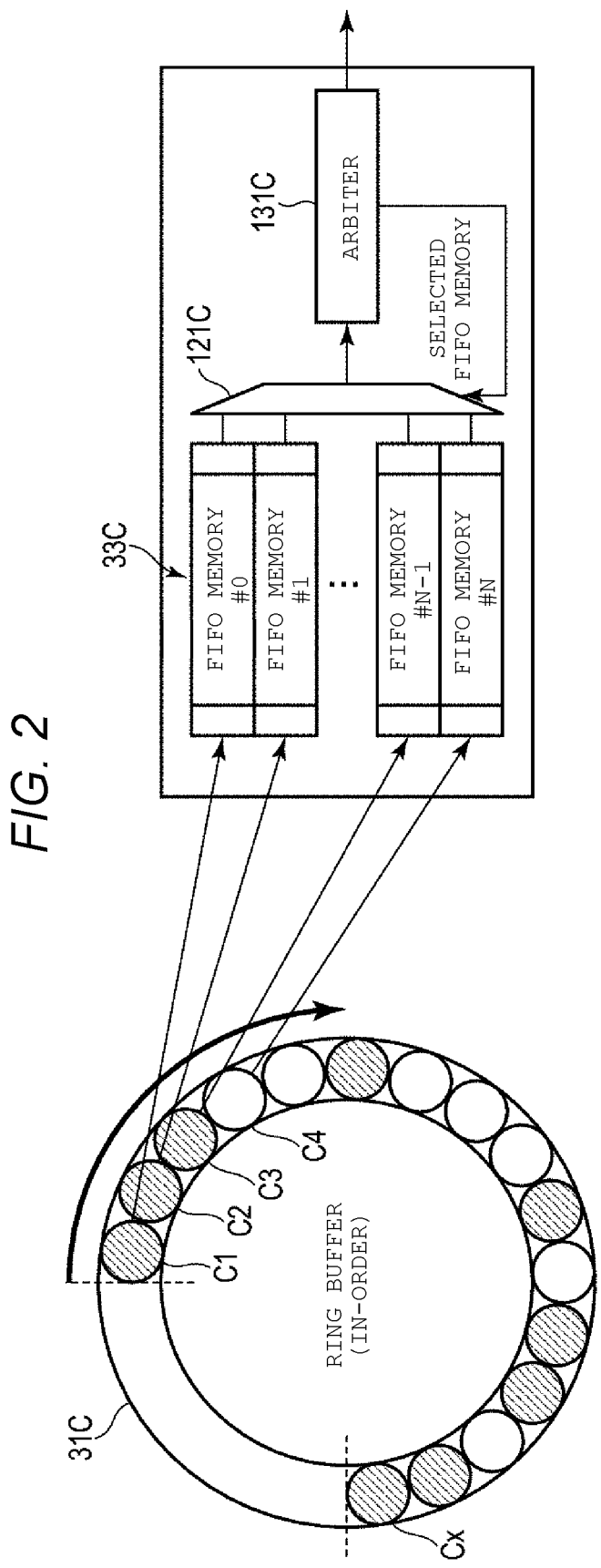
FIG. 2 is a diagram illustrating an example of degradation in latency and deterioration in usage efficiency of resources in a memory system according to a comparative example.

FIG. 2 is a diagram illustrating an example of degradation in latency and deterioration in usage efficiency of resources in a memory system according to a comparative example. The memory system according to the comparative example includes a ring buffer 31C, a plurality of FIFO memories 33C, an arbiter 131C, and a multiplexer 121C.

Each of the plurality of FIFO memories 33C is a memory in which a request acquired from the host can be stored according to the FIFO scheme. The plurality of FIFO memories 33C correspond to a plurality of processes subject to the parallel process management, respectively. One request acquired from the host is stored in any one of the plurality of FIFO memories 33C based on a corresponding process. The requests are stored in any one of the plurality of FIFO memories 33C, and thus information regarding the original request order is lost.

The ring buffer 31C is a resource in which the in-order process is assumed. In the ring buffer 31C, a plurality of storage regions C1, C2, C3, C4, . . . , Cx are allocated in order in response to a plurality of requests from the host.

The arbiter 131C arbitrates the plurality of FIFO memories 33C and selects one FIFO memory 33C from the FIFO memories 33C during execution a process. The arbiter 131C acquires the request of the head of the selected FIFO memory 33C via the multiplexer 121C. Accordingly, a process in response to the acquired request is executed.

In the arbitration by the arbiter 131C, the original request order is not considered. Therefore, the process in response to the request is an out-of-order process. Accordingly, there is a possibility that the latency of a response to the request will deteriorate.

In the out-of-order process, releasing of a storage region corresponding to the ring buffer 31C becomes out of order according to completion of the process of the request. In the ring buffer 31C, all the storage regions from the allocated head storage region C1 to a last storage region Cx are regarded as being used. For example, even when a storage region C4 between the head and last storage regions is released according to completion of a process of a corresponding request, the storage region C4 is regarded as being used. In this way, in the ring buffer 31C, a storage region that is regarded as being used even if the storage region is not actually used occurs in some cases. This is a factor causing deterioration of the usage efficiency of the ring buffer 31C. Accordingly, in the memory system according to the comparative example, there is a possibility of deterioration of efficiency of a process in response to a request from the host due to the deterioration of the usage efficiency of the ring buffer 31C.

To inhibit the above-described deterioration of the efficiency of the process, the memory system 3 according to the embodiment includes the physical channel 32 in which requests are stored in the original request order and the plurality of virtual channels 33 in which requests are stored for the parallel process management.

When the degree of flexibility of the parallel process management is equal to or greater than the predetermined threshold, the controller 5 acquires a request from the physical channel 32. When the degree of flexibility of the parallel process management is less than the predetermined threshold, the controller 5 acquires a request from one of the plurality of virtual channels 33. Accordingly, when the degree of flexibility of the parallel process management is equal to or greater than the threshold, latency of a response to the request is shortened by the in-order process of the request that follows the original request order, and thus it is possible to improve usage efficiency of resources. The case in which "the degree of flexibility of the parallel process management is equal to or greater than the threshold" may be replaced with the required degree of parallelism is less than the threshold.

When the degree of flexibility of the parallel process management is less than the threshold, operation performance of all the plurality of memory chips 41 can be improved by the out-of-order process in which processes are executed in response to requests. The case in which "the degree of flexibility of the parallel process management is less than the threshold" may be replaced with the required degree of parallelism is equal to or greater than the threshold.

The in-order process and the out-of-process have a trade-off relationship between usage efficiency of resources and latency and operation performance of all the plurality of memory chips 41. In the memory system 3, by selectively using the physical channel 32 and the virtual channels 33 according to the degree of flexibility of the parallel process management, it is possible to improve efficiency of a process in the memory system 3.

Figure 3:
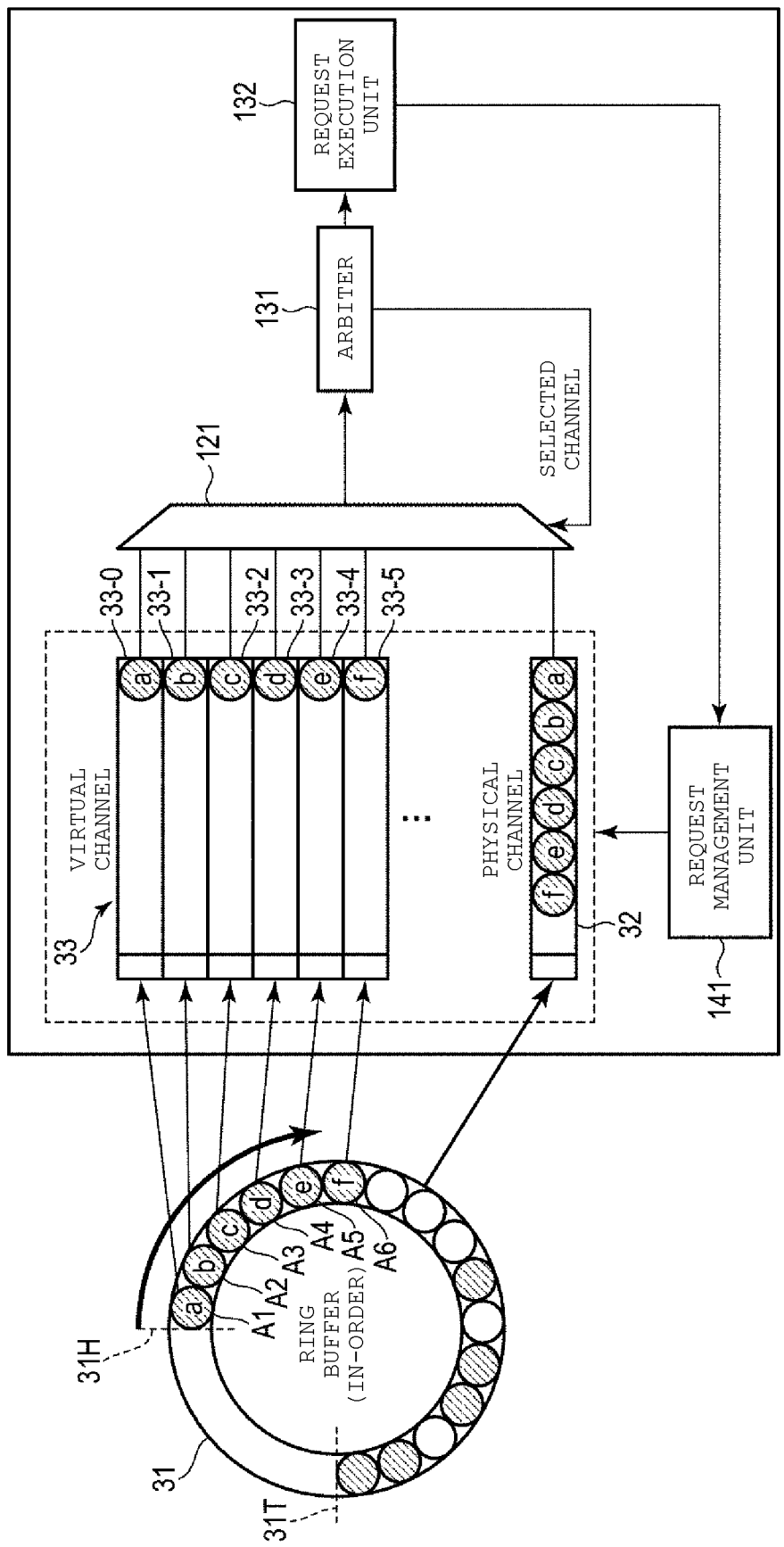
FIG. 3 is a diagram illustrating an example of execution of requests from a host in a memory system according to an embodiment.

FIG. 3 is a diagram illustrating an example of execution of requests from the host 2 in the memory system 3. In a configuration related to execution of requests from the host 2, for example, the request management unit 141, the physical channel 32, the plurality of virtual channels 33, the ring buffer 31, the arbiter 131, the request execution unit 132, and the multiplexer 121 are included. This configuration is implemented as, for example, a hardware accelerator.

The request management unit 141 physically stores requests acquired from the submission queue 221 of the host 2 via the host I/F 11 in the physical channel 32 in the original request order.

The request management unit 141 further virtually stores the request in one of the plurality of virtual channels 33. Specifically, the plurality of virtual channels 33 correspond to a plurality of processes subject to the parallel process management, respectively. The request management unit 141 specifies one virtual channel 33 to which the request is assigned based on the process corresponding to the request. The request management unit 141 virtually stores the request in the specified virtual channel 33. In the virtual channels 33, the order of the requests is managed for each corresponding process. In the virtual channels 33, information regarding the original request order is not maintained.

The ring buffer 31 is a resource in which the in-order process is assumed. In the ring buffer 31, one or more storage regions corresponding to one or more requests acquired from the submission queue 221 are allocated. For example, the request management unit 141 allocates the storage regions of the ring buffer 31.

The arbiter 131 executes an arbitration operation on the physical channel 32 and the plurality of virtual channels 33. Specifically, the arbiter 131 selects one channel from which requests are to be acquired from the physical channel 32 and the plurality of virtual channels 33 by arbitration. The arbiter 131 acquires a request of the head of the selected channel via the multiplexer 121. The arbiter 131 transmits the acquired request to the request execution unit 132.

More specifically, the arbiter 131 transmits information for identifying the selected channel (hereinafter referred to as selected channel information) to the multiplexer 121. The selected channel information is, for example, a number allocated to the channel. The multiplexer 121 specifies one corresponding channel based on the received selected channel information. The multiplexer 121 reads the request stored in the head of the specified channel. When the specified channel is the physical channel 32, the read request is a request physically stored in the head of the physical channel 32. When the specified channel is the virtual channel 33, the read request is a request virtually stored in the head of the virtual channel 33. The multiplexer 121 transmits the read request to the arbiter 131.

The request execution unit 132 executes a process in response to the request received from the arbiter 131. The request execution unit 132 notifies the request management unit 141 of completion of the process in response to the request.

The request management unit 141 deletes the corresponding request from both the physical channel 32 and the virtual channel 33 according to the notification by the request execution unit 132. More specifically, the request management unit 141 deletes the request physically stored in the physical channel 32 and deletes the request virtually stored in the virtual channel 33. The request management unit 141 releases the storage region allocated to the request in the ring buffer 31.

Hereinafter, physically storing the request in the physical channel 32 by the request management unit 141 is also simply referred to as storing the request in the physical channel 32. Deleting the request physically stored in the physical channel 32 by the request management unit 141 is also simply referred to as deleting the request from the physical channel 32. Virtually storing the request in the virtual channel 33 by the request management unit 141 is also simply referred to as storing the request in the virtual channel 33. Deleting the request virtually stored in the virtual channel 33 by the request management unit 141 is also simply referred to as deleting the request from the virtual channel 33.

In the example illustrated in FIG. 3, requests a, b, c, d, e, f, and . . . acquired from the submission queue 221 of the host 2 are stored in the physical channel 32 in the order of the acquisition. The requests a, b, c, d, e, f, . . . are also stored in a 0th virtual channel 33-0, a 1st virtual channel 33-1, a 2nd virtual channel 33-2, a 3rd virtual channel 33-3, a 4th virtual channel 33-4, a 5th virtual channel 33-5, . . . , respectively.

In the ring buffer 31, storage regions A1, A2, A3, A4, A5, A6, . . . and are allocated in order to the requests a, b, c, d, e, f, . . . , respectively. In the ring buffer 31, storage regions indicated by hatchings indicate allocated storage regions, and storage regions illustrated in blanks indicate storage regions released according to completion of the process of the corresponding requests. Since the ring buffer 31 is a resource in which the in-order process is assumed, all the storage regions from the head 31H (here, the storage region A1) to the last 31T of the allocated storage regions are regarded as being used. Since several storage regions illustrated in blanks are storage regions between the head 31H and the last 31T, these storage regions are released, but regarded as being used.

An arbitration operation will be described with reference to FIGS. 4 and 5.

Figure 4:
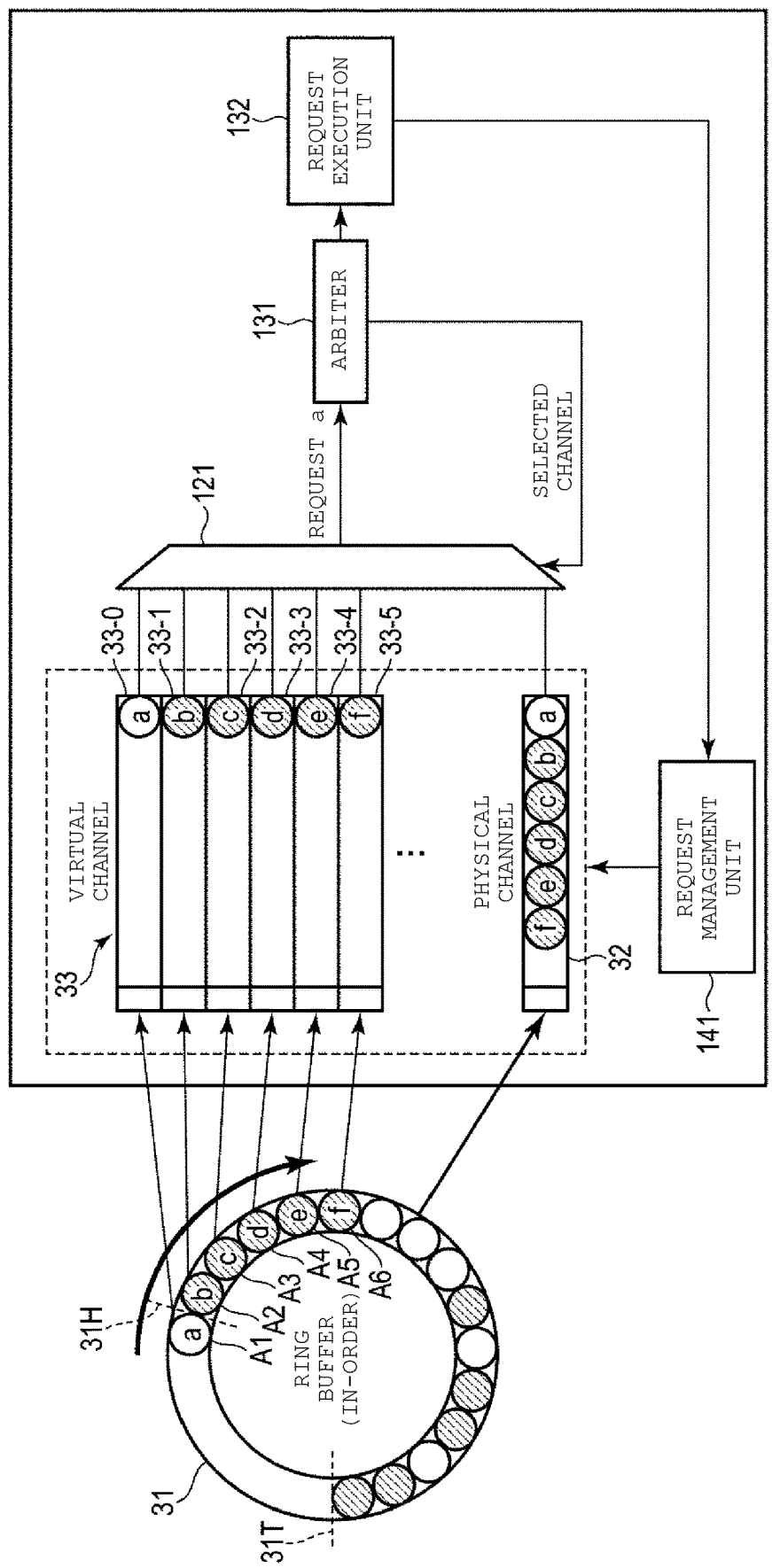
FIG. 4 is a diagram illustrating an example of an arbitration operation when the degree of flexibility of parallel process management is equal to or greater than a threshold in the memory system.

FIG. 4 is a diagram illustrating an example of an arbitration operation when the degree of flexibility of the parallel process management is equal to or greater than the threshold. The requests stored in the physical channel 32 and the virtual channels 33 and the storage regions allocated in the ring buffer 31 are as described above with reference to FIG. 3.

When the degree of flexibility of the parallel process management is equal to or greater than the threshold, the arbiter 131 acquires the request a from the head of the physical channel 32. Specifically, the arbiter 131 transmits information indicating the physical channel 32 to the multiplexer 121 based on the degree of flexibility of the parallel process management that is equal to or greater than the threshold. The multiplexer 121 reads the request a from the head of the physical channel 32 based on the information indicating the physical channel 32. Then, the multiplexer 121 transmits the read request a to the arbiter 131. The arbiter 131 transmits the request a acquired via the multiplexer 121 to the request execution unit 132.

The request execution unit 132 executes a process in response to the request a received from the arbiter 131. In this way, the request execution unit 132 executes the process using the physical channel 32 when the degree of flexibility of the parallel process management is equal to or greater than the threshold. The request execution unit 132 notifies the request management unit 141 of completion of the process in response to the request a.

The request management unit 141 deletes the request a stored in the physical channel 32 and deletes the request a stored in the virtual channel 33 in response to the notification by the request execution unit 132. That is, the deletion of the request a stored in the physical channel 32 is also reflected in the request a stored in the virtual channel 33. The request management unit 141 release the storage region A1 in the ring buffer 31 allocated to the request a.

In this way, when the degree of flexibility of the parallel process management is equal to or greater than the threshold, the requests from the host 2 are processed in the original request order using the physical channel 32. Accordingly, since the head request a is processed in the original request order, it is possible to shorten latency of response to the request a. In the ring buffer 31, the storage region A1 allocated to the request a is released, and thus a size of the storage regions regarded as being used (that is, the storage regions from the head 31H to the last 31T) is reduced. Therefore, it is possible to improve usage efficiency of the ring buffer 31.

Figure 5:
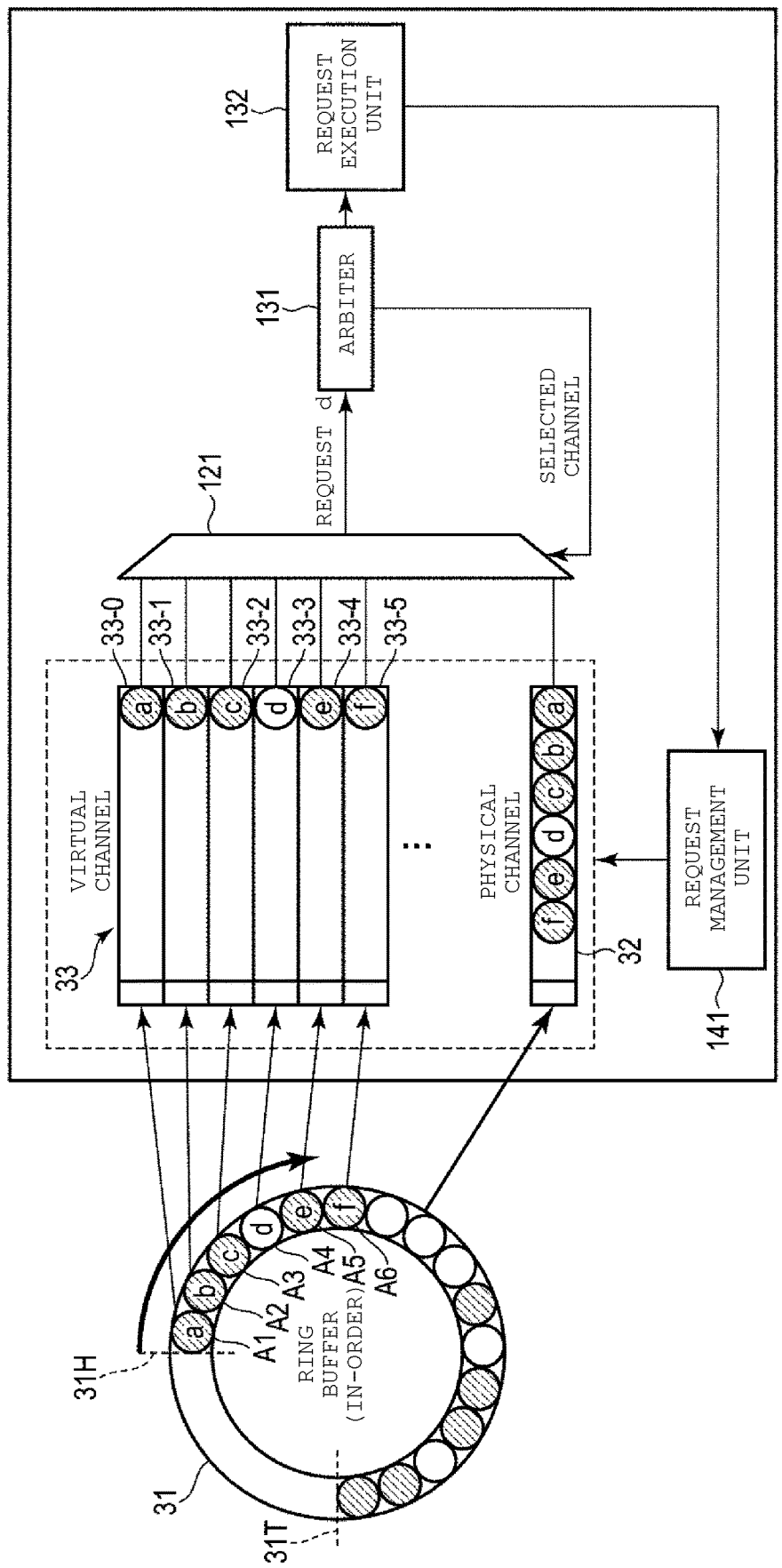
FIG. 5 is a diagram illustrating an example of an arbitration operation when the degree of flexibility of parallel process management is less than the threshold in the memory system.

FIG. 5 is a diagram illustrating an example of an arbitration operation when the degree of flexibility of parallel process management is less than the threshold. The requests stored in the physical channel 32 and the virtual channels 33 and the storage regions allocated in the ring buffer 31 have been described with reference to FIG. 3.

When the degree of flexibility of the parallel process management is less than the threshold, the arbiter 131 selects one or more virtual channels 33 from the plurality of virtual channels 33 and acquires the request from the head of the selected virtual channel 33. Here, it is assumed that the 3rd virtual channel 33-3 is selected. The arbiter 131 acquires the request d from the head of the 3rd virtual channel 33-3.

More specifically, the arbiter 131 selects the 3rd virtual channel 33-3 corresponding to a presently executable process from the plurality of virtual channels 33 based on the degree of flexibility of the parallel process that is less than the threshold. The arbiter 131 transmits information indicating the selected 3rd virtual channel 33-3 to the multiplexer 121. The multiplexer 121 reads the request d from the head of the 3rd virtual channel 33-3 based on the information indicating the 3rd virtual channel 33-3. Then, the multiplexer 121 transmits the read request d to the arbiter 131.

When there are a plurality of presently executable processes, the arbiter 131 selects one virtual channel 33 in which the earlier request in the original request order is stored from the plurality of virtual channels 33 corresponding to the plurality of processes.

The arbiter 131 transmits the request d acquired via the multiplexer 121 to the request execution unit 132.

The request execution unit 132 executes a process in response to the request d received from the arbiter 131. In this way, the request execution unit 132 executes the process using the virtual channel 33 when the degree of flexibility of the parallel process management is less than the threshold. The request execution unit 132 notifies the request management unit 141 of completion of the process in response to the request d.

The request management unit 141 deletes the request d stored in the 3rd virtual channel 33-3 and deletes the request d stored in the physical channel 32 according to the notification by the request execution unit 132. That is, the deletion of the request d stored in the 3rd virtual channel 33-3 is also reflected in the request d stored in the physical channel 32. The request management unit 141 releases the storage region A4 allocated with the request d in the ring buffer 31

In this way, when the degree of flexibility of the parallel process management is less than the threshold, the requests from the host 2 are processed in parallel using the virtual channels 33 according to the restriction of the parallel process management. Accordingly, the operation performance of all the plurality of memory chips 41 can be improved so that the restriction of the parallel process management is satisfied.

The physical channel 32 and the virtual channels 33 are implemented using, for example, link lists. Examples in which the physical channel 32 and the virtual channels 33 are implemented using link lists will be described with reference to FIGS. 6 to 16. Hereinafter, a case in which three requests a, b, and c are stored in the physical channel 32 and the virtual channels 33 will be exemplified. The number of virtual channels 33 provided in the memory system 3 is assumed to be four. The four virtual channels 33 are a 0th virtual channel, a 1st virtual channel 33-1, a 2nd virtual channel 33-2, and a 3rd virtual channel 33-3.

Figure 6:
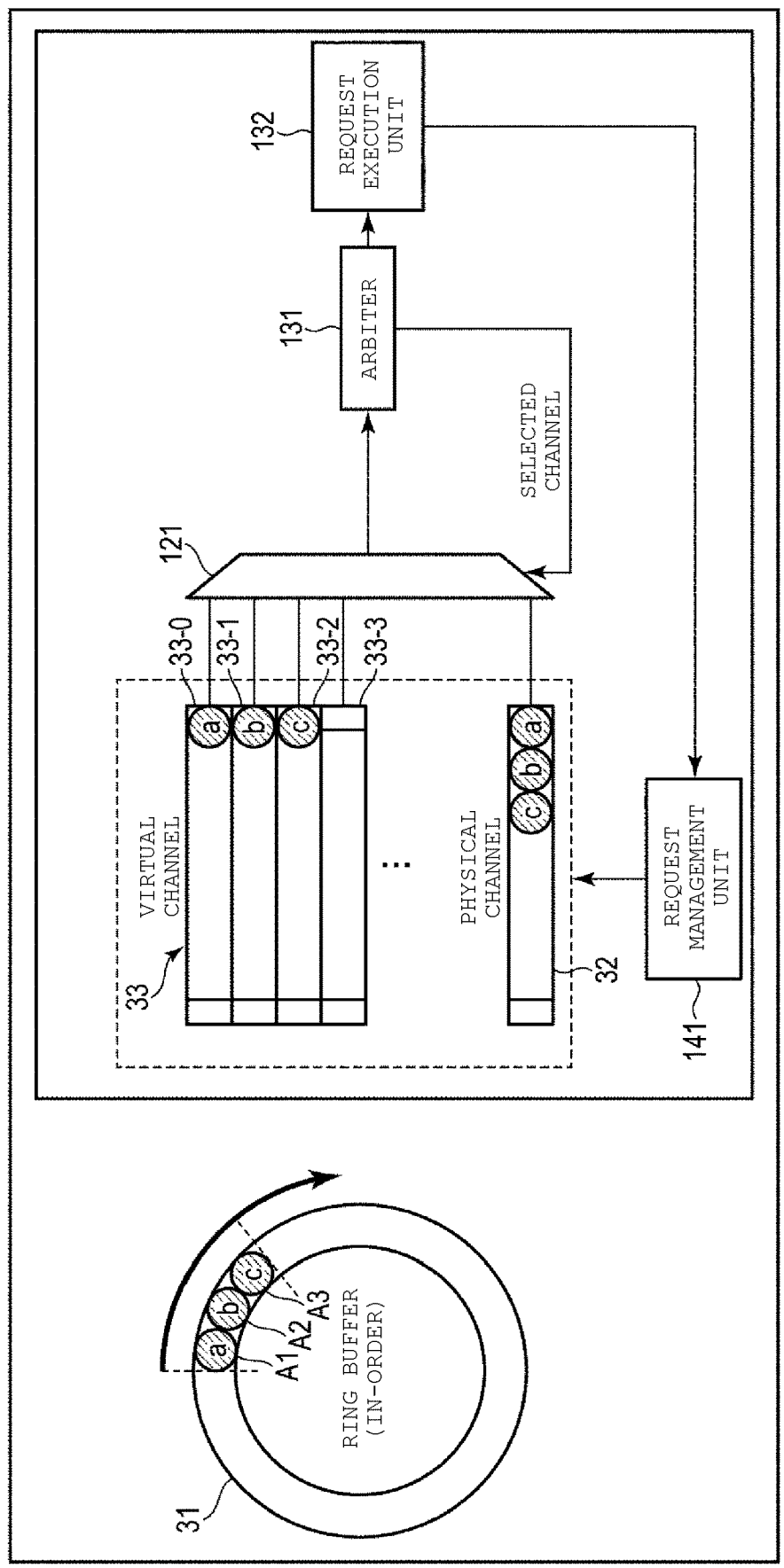
FIG. 6 is a diagram illustrating an example in which three requests are stored in physical channels and virtual channels of the memory system according to the embodiment.

FIG. 6 is a diagram illustrating an example in which three requests a, b, and c are stored in the physical channels 32 and the virtual channels 33.

The requests a, b, and c are stored in the original request order in the physical channel 32. The requests a, b, and c are stored in the 0th virtual channel, the 1st virtual channel 33-1, and the 2nd virtual channel 33-2, respectively.

In the ring buffer 31, the storage regions A1, A2, and A3 respectively corresponding to the requests a, b, and c are allocated in order.

Figure 7:
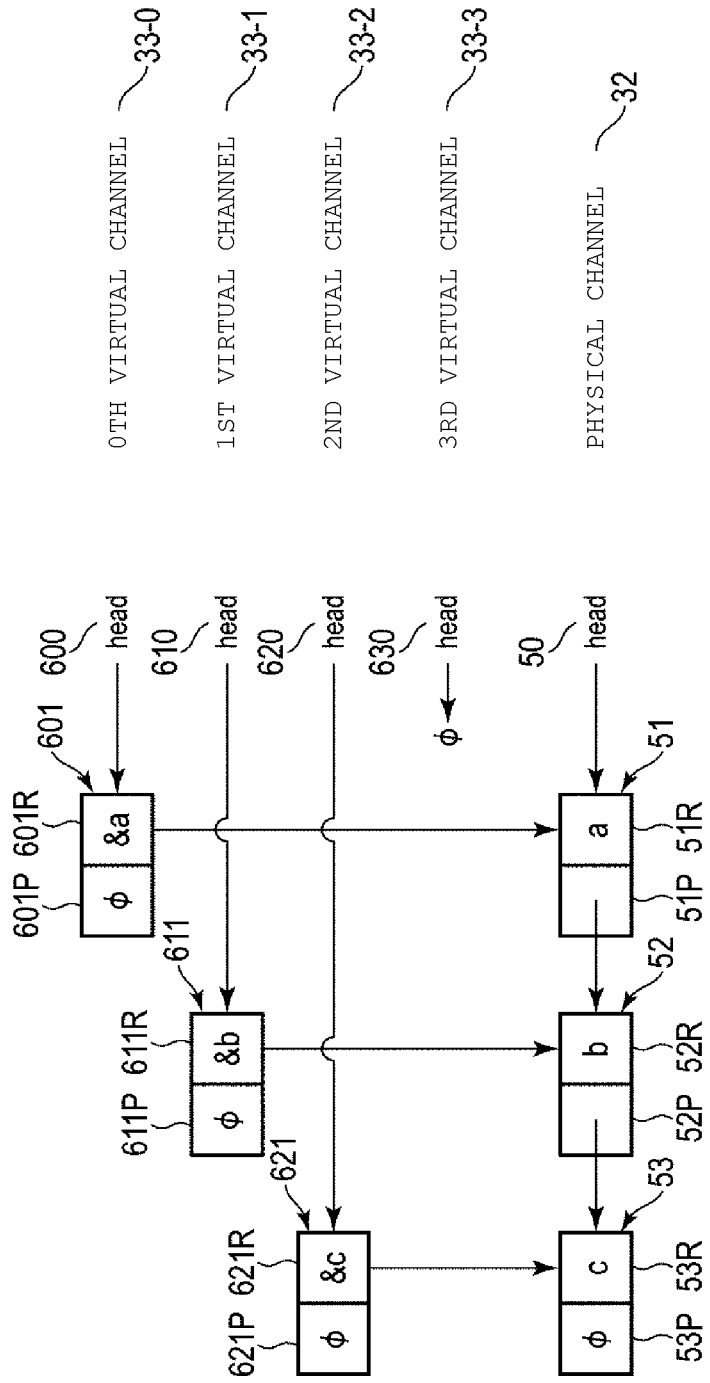
FIG. 7 is a diagram illustrating an example of link lists for implementing the physical channels and the virtual channels in FIG. 6.

FIG. 7 is a diagram illustrating an example of link lists for implementing the physical channels 32 and the virtual channels 33 in FIG. 6.

The link list of the physical channel 32 can include a head pointer 50 and one or more entries. When the physical channel 32 is available, the number of entries in the link list of the physical channel 32 is 0. Here, the link list of the physical channel 32 includes entries 51, 52, and 53 respectively corresponding to the requests a, b, and c.

The head pointer 50 is information indicating an entry corresponding to the head request stored in the physical channel 32 (here, the entry 51 corresponding to the request a).

The entry of the physical channel 32 includes a request field and a pointer field. In the entry of the physical channel 32 corresponding to a certain request, the request itself can be stored. In the pointer field, a pointer indicating an entry corresponding to a subsequent request of the request can be stored. The pointer indicating the entry is, for example, information indicating the position of a storage region (for example, a storage position in the SRAM 12) in the memory allocated as the entry.

Specifically, the entry 51 corresponding to the request a includes a request field 51R and a point field 51P. In the request field 51R, the request a is stored. In the pointer field 51P, a pointer indicating the entry 52 corresponding to the subsequent request b is stored.

The entry 52 corresponding to the request b includes a request field 52R and a point field 52P. In the request field 52R, the request b is stored. In the pointer field 52P, a pointer indicating the entry 53 corresponding to the subsequent request c is stored.

The entry 53 corresponding to the request c includes a request field 53R and a point field 53P. In the request field 53R, the request c is stored. The pointer field 53P becomes, for example, null since a subsequent request of the request c is not stored in the physical channel 32. The pointer field 53P that is null indicates that the entry 53 is a termination entry of the physical channel 32. In the drawing, null is denoted by "Φ."

The link list of the 0th virtual channel 33-0 can include a head pointer 600 and one or more entries. When the 0th virtual channel 33-0 is available, the number of entries in the link list of the 0th virtual channel 33-0 is 0. Here, the link list of the 0th virtual channel 33-0 includes an entry 601 corresponding to the request a.

The head pointer 600 indicates an entry corresponding to the head request stored in the 0th virtual channel 33-0 (here, the entry 601 corresponding to the request a).

The entry of the virtual channel 33 includes a request field and a pointer field. In the entry of the virtual channel 33 corresponding to a certain request, the request field can store a pointer indicating an entry in the physical channel 32 in which the request itself is stored. That is, the request itself is acquired by referring to the entry in the physical channel 32 based on the pointer stored in the request field. The pointer field can store a pointer indicating an entry corresponding to a subsequent request of the request.

Specifically, the entry 601 corresponding to the request a includes a request field 601R and a pointer field 601P. In the request field 601R, a pointer indicating the entry 51 in the physical channel 32 in which the request a itself is stored is stored. That is, the request a itself is acquired by referring to the entry 51 in the physical channel 32 based on the pointer stored in the request field 601R. The pointer field 601P becomes, for example, null since a subsequent request of the request a is not stored in the 0th virtual channel 33-0. The pointer field 601P that is null indicates that the entry 601 is a termination entry of the 0th virtual channel 33-0.

The link list of the 1st virtual channel 33-1 can include a head pointer 610 and one or more entries. When the 1st virtual channel 33-1 is available, the number of entries in the link list of the 1st virtual channel 33-1 is 0. Here, the link list of the 1st virtual channel 33-1 includes an entry 611 corresponding to the request b.

The head pointer 610 indicates an entry corresponding to the head request stored in the 1st virtual channel 33-1 (here, the entry 611 corresponding to the request b).

The entry 611 corresponding to the request b includes a request field 611R and a pointer field 611P. In the request field 611R, a pointer indicating the entry 52 in the physical channel 32 in which the request by itself is stored is stored. The pointer field 611P becomes, for example, null since a subsequent request of the request b is not stored in the 1st virtual channel 33-1.

The link list of the 2nd virtual channel 33-2 can include a head pointer 620 and one or more entries. When the 2nd virtual channel 33-2 is available, the number of entries in the link list of the 2nd virtual channel 33-2 is 0. Here, the link list of the 2nd virtual channel 33-2 includes an entry 621 corresponding to the request c.

The head pointer 620 indicates an entry corresponding to the head request stored in the 2nd virtual channel 33-2 (here, the entry 621 corresponding to the request c).

The entry 621 corresponding to the request c includes a request field 621R and a pointer field 621P. In the request field 621R, a pointer indicating the entry 53 in the physical channel 32 in which the request c itself is stored is stored. The pointer field 621P becomes, for example, null since a subsequent request of the request c is not stored in the 2nd virtual channel 33-2.

The link list of the 3rd virtual channel 33-3 can include a head pointer 630 and one or more entries. When the 3rd virtual channel 33-3 is available, the number of entries in the link list of the 3rd virtual channel 33-3 is 0. Here, the link list of the 3rd virtual channel 33-3 does not include any entry.

The head pointer 630 does not indicate any entry since there is no request stored in the 3rd virtual channel 33-3. For example, null is set in the head pointer 630.

(1) the physical channel 32 in which the requests a, b, and c are stored in the original request order (2) the 0th virtual channel 33-0, the 1st virtual channel 33-1, and the 2nd virtual channel 33-2, in which the requests a, b, and c are respectively stored can be implemented by the link lists. When the physical channel 32 and the virtual channels 33 are implemented by the link lists, the requests themselves may be disposed in any locations in memory (for example, the SRAM 12). Therefore, even when the requests acquired in the middle of the original request order and the entries corresponding to the requests are deleted from the link lists, the pointers in the link lists may be corrected and the usage efficiency of the memory can be improved. The link list of each channel may include a tail pointer indicating termination of the link list so that the entry of the termination can be specified at a fixed time. In this case, for example, a pointer indicating the tail pointer is stored in the pointer field of the entry of the termination. The link list of the physical channel may be a bidirectional list. In this case, a pointer to the entry of a previous request is stored in the second pointer field.

Here, an example of an operation in which the arbiter 131 acquires the requests from the link lists of the physical channel 32 and the virtual channels 33 will be described.

The arbiter 131 specifies the entry 51 of the request a using the head pointer 50 of the physical channel 32, for example, when the request is acquired from the head of the physical channel 32. The arbiter 131 acquires the request a (that is, the substance of the request a) from the request field 51R of the specified entry 51.

In this way, the arbiter 131 can acquire the request a from the head entry 51 of the physical channel 32 from association of one step based on the head pointer 50 of the physical channel 32.

The arbiter 131 specifies the entry 601 of the request a using the head pointer 600 of the 0th virtual channel 33-0, for example, when the request is acquired from the head of the 0th virtual channel 33-0. The arbiter 131 acquires a pointer indicating the entry 51 in the physical channel 32 in which the request a is stored from the request field 601R of the specified entry 601. The arbiter 131 specifies the entry 51 of the request a using the acquired pointer. The arbiter 131 acquires the request a from the request field 51R of the specified entry 51.

The arbiter 131 specifies the entry 611 of the request b using the head pointer 610 of the 1st virtual channel 33-1, for example, when the request is acquired from the head of the 1st virtual channel 33-1. The arbiter 131 acquires a pointer indicating the entry 52 in the physical channel 32 in which the request b is stored from the request field 611R of the specified entry 611. The arbiter 131 specifies the entry 52 of the request b using the acquired pointer. The arbiter 131 acquires the request b from the request field 52R of the specified entry 52.

The arbiter 131 specifies the entry 621 of the request c using the head pointer 620 of the 2nd virtual channel 33-2, for example, when the request is acquired from the head of the 2nd virtual channel 33-2. The arbiter 131 acquires a pointer indicating the entry 53 in the physical channel 32 in which the request c is stored from the request field 621R of the specified entry 621. The arbiter 131 specifies the entry 53 of the request c using the acquired pointer. The arbiter 131 acquires the request c from the request field 53R of the specified entry 53.

The arbiter 131 does not execute an operation of acquiring the request from, for example, the 3rd virtual channel 33-3 since the head pointer 630 of the 3rd virtual channel 33-3 does not indicate any entry.

In this way, the arbiter 131 can specify the head entry (that is, the head entry of the virtual channel 33) based on the head pointer of the virtual channel 33 and can acquire the substance of the request from the entry of the physical channel 32 indicated by the pointer stored in the request field of the head entry. That is, when the request is acquired from the virtual channel 33, the request can be acquired from the head of the virtual channel 33 by association of two steps of the head pointer of the virtual channel 33 and the pointer stored in the request field of the head entry of the virtual channel 33.

Next, an enqueue operation implemented using the link list will be described with reference to FIGS. 8 and 9.

Figure 8:
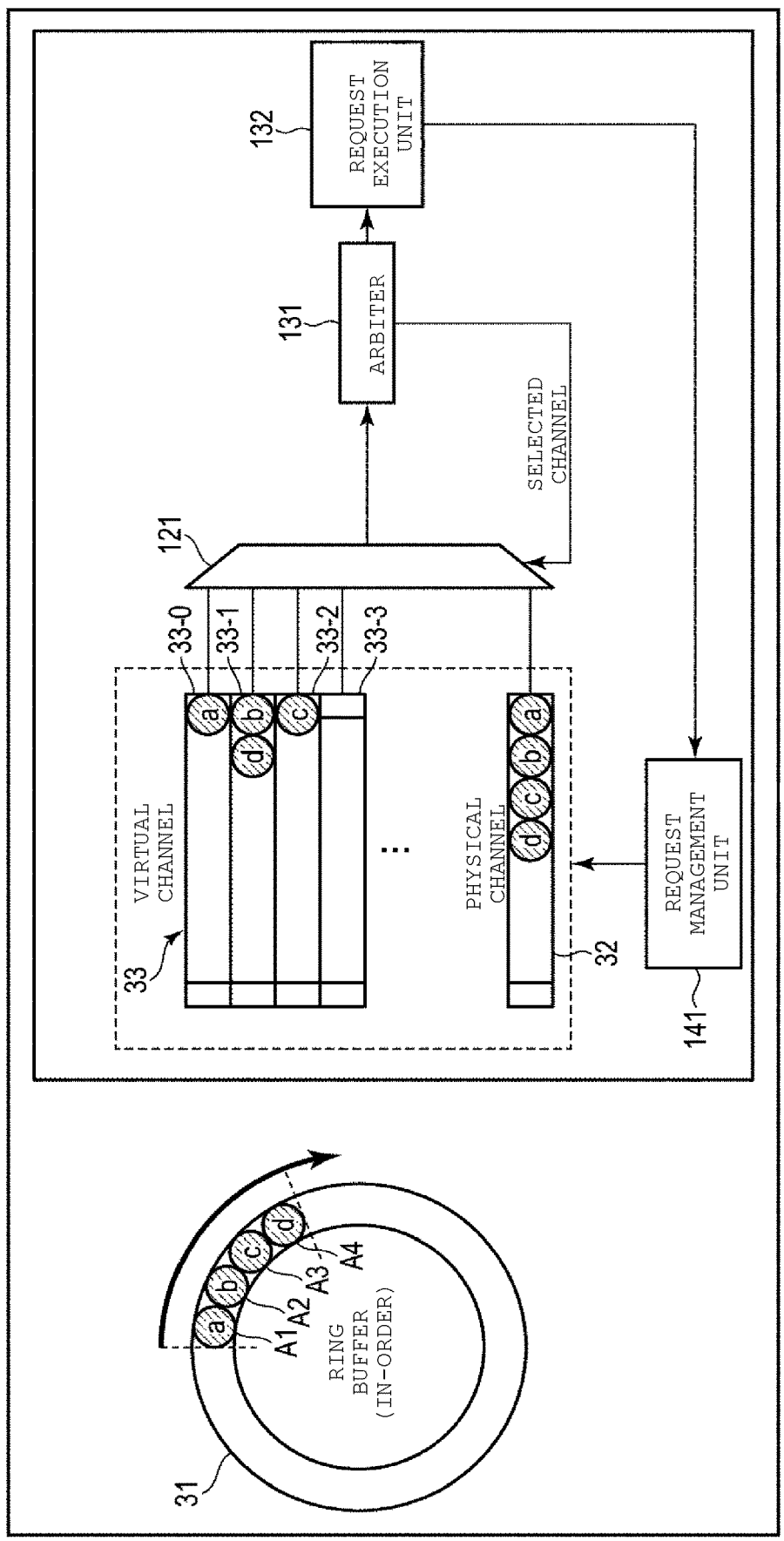
FIG. 8 is a diagram illustrating an example of an enqueue operation in the memory system.

FIG. 8 is a diagram illustrating an example of an enqueue operation. Here, an enqueue operation of adding the request d acquired from the submission queue 221 of the host 2 to the physical channel 32 and the virtual channel 33 illustrated in FIG. 6 will be exemplified. The memory chip 41 in which the request d is a target is assumed to correspond to a process with which the 1st virtual channel 33-1 is associated.

The enqueue operation of adding the request d includes an operation of adding the request d to the physical channel 32 and an operation of adding the request d to the 1st virtual channel 33-1. The request d is added to the end of the request (here, behind the request c) stored in the physical channel 32. The request d is added to the end of the request (here, behind the request b) stored in the 1st virtual channel 33-1.

In the ring buffer 31, the storage region A4 corresponding to the request d is newly allocated.

Figure 9:
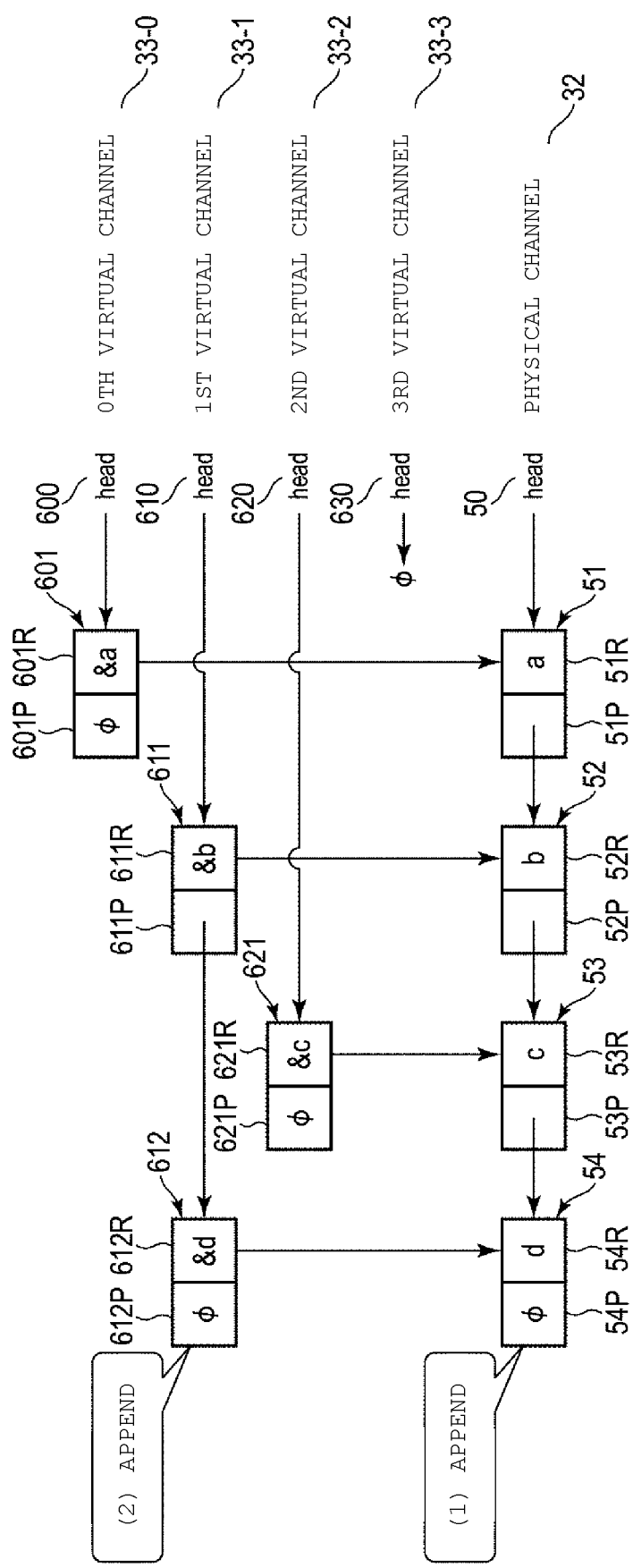
FIG. 9 is a diagram illustrating a link list updated in the enqueue operation in FIG. 8.

FIG. 9 is a diagram illustrating a link list in which the physical channels 32 and the virtual channels 33 in FIG. 8 are implemented.

In the enqueue operation, the request management unit 141 appends the entry 54 of the request d to the end of the link list of the physical channel 32 ((1) in FIG. 9) and appends an entry 612 of the request d to the end of the link list of the 1st virtual channel 33-1 ((2) in FIG. 9).

Specifically, the request management unit 141 allocates a storage region on the SRAM 12 as the entry 54 of the physical channel 32 corresponding to the request d. The request management unit 141 stores the request d in the request field 54R of the entry 54. The request management unit 141 stores a pointer indicating the entry 54 of the request d in the pointer field 53P of the entry 53 of the request c to change the entry of the termination of the physical channel 32 from the entry 53 corresponding to the request c immediately before the request d to the entry 54 of the request d. The pointer field 54P of the entry 54 of the request d is null.

Subsequently, the request management unit 141 specifies the 1st virtual channel 33-1 to which the request d is assigned. For example, the request management unit 141 specifies a process corresponding to the request d (more specifically, the memory chip 41 in which the request d is a target) and determines the 1st virtual channel 33-1 corresponding to the specified process. The request management unit 141 allocates a storage region on the SRAM 12 as the entry 612 of the 1st virtual channel 33-1 corresponding to the request d. The request management unit 141 stores a pointer indicating the entry 54 of the physical channel 32 in which the request d itself is stored in the request field 612R of the entry 612. The request management unit 141 stores a pointer indicating the entry 612 of the request d in the pointer field 611P of the entry 611 of the request b to change the entry of the termination of the 1st virtual channel 33-1 from the entry 611 corresponding to the request b immediately before the request d to the entry 612 of the request d. The pointer field 612P of the entry 612 of the request d is null.

In this way, the request management unit 141 can implement the enqueue operation of adding a request to each of the physical channel 32 and the virtual channels 33 by an operation of appending an entry to each of the link list of the physical channel 32 and the link lists of the virtual channels 33.

Next, a dequeue operation implemented using the link list will be described with reference to FIGS. 10 to 13.

Figure 10:
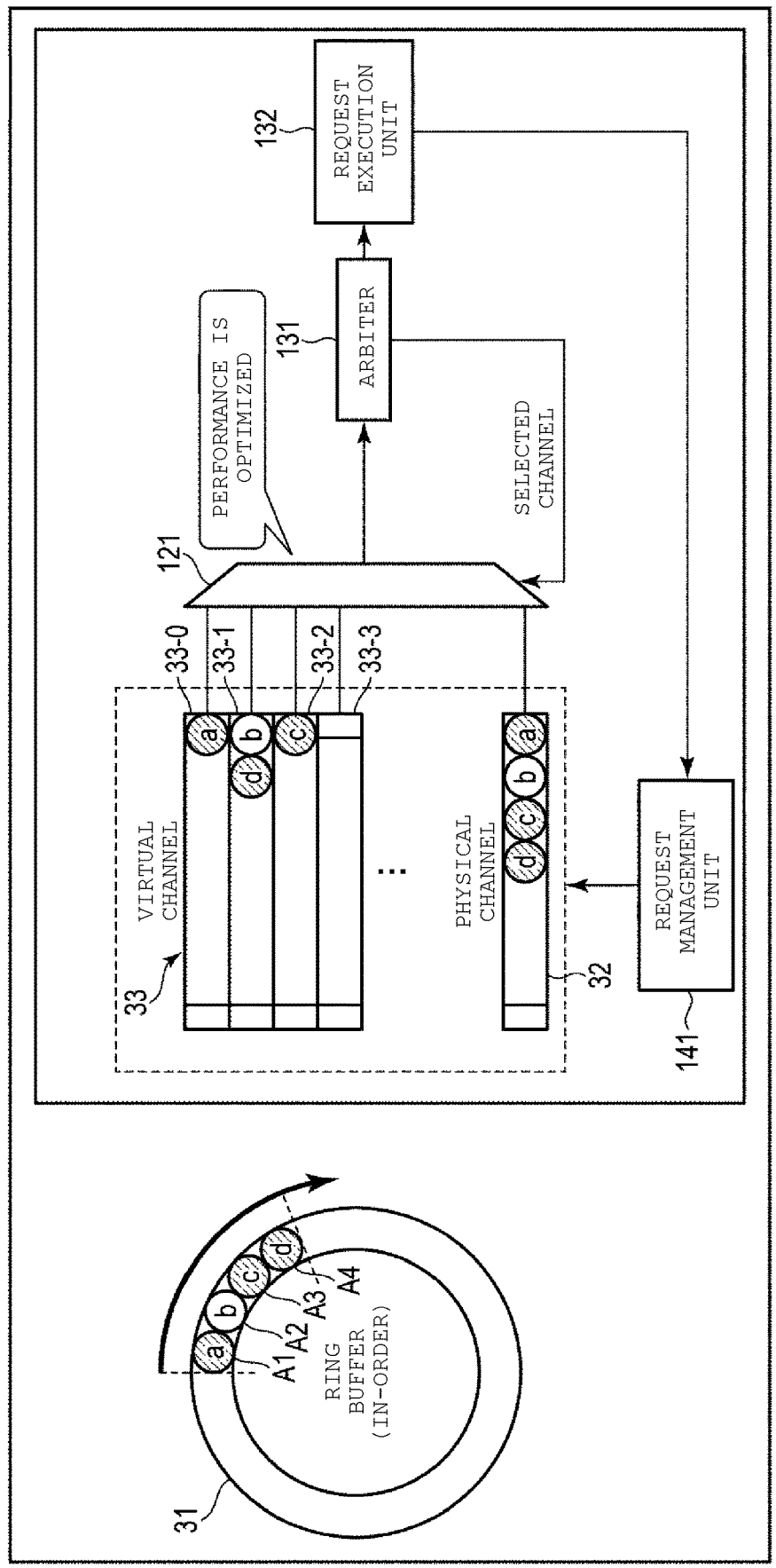
FIG. 10 is a diagram illustrating a first example of a dequeue operation in the memory system according to the embodiment.

FIG. 10 is a diagram illustrating a first example of a dequeue operation. Here, a dequeue operation of deleting the request b from the physical channel 32 and the virtual channel 33 after the enqueue operation illustrated in FIG. 8 will be exemplified. For example, when the degree of flexibility of the parallel process management is less than the threshold, the dequeue operation is executed after the arbiter 131 selects the 1st virtual channel 33-1 and acquires the request b from the head of the 1st virtual channel 33-1, and the request execution unit 132 executes a process in response to the request b. When the degree of flexibility of the parallel process management is less than the threshold, operation performance of all the plurality of memory chips 41 is optimized by the out-of-order process in which the process are executed in parallel in response to a request.

The dequeue operation of deleting the request b includes an operation of deleting the request b from the 1st virtual channel 33-1 and an operation of deleting the request b from the physical channel 32. The request b is deleted from the head of the 1st virtual channel 33-1. The request b is deleted between the requests a and c in the physical channel 32.

In the ring buffer 31, the storage region A2 corresponding to the request b is released.

Figure 11:
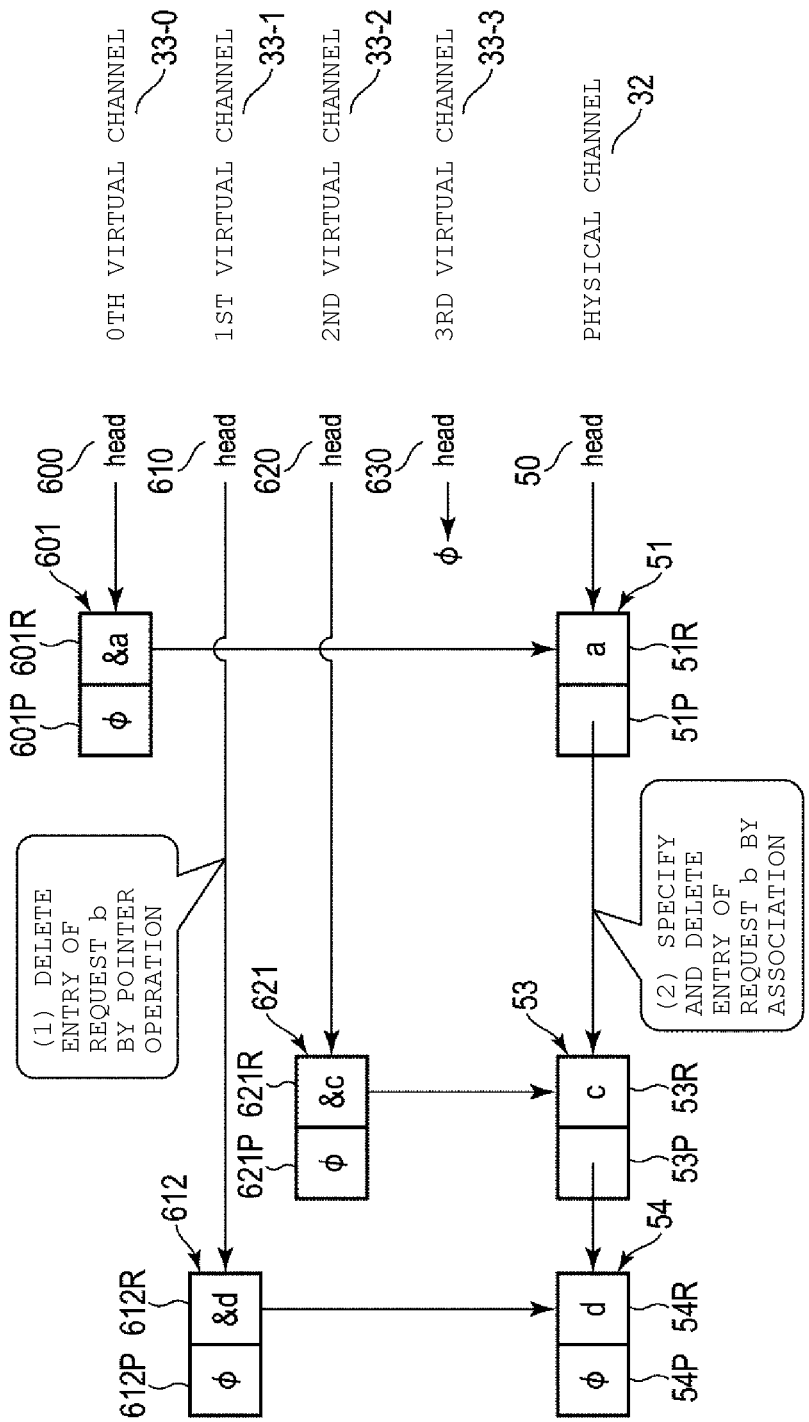
FIG. 11 is a diagram illustrating a link list updated in the dequeue operation in FIG. 10.

FIG. 11 is a diagram illustrating an example of link lists for implementing the physical channels 32 and the virtual channels 33 in FIG. 10.

In a first example of the dequeue operation, the request management unit 141 deletes the entry 611 of the request b from the link list of the 1st virtual channel 33-1 ((1) in FIG. 11) and deletes the entry 52 of the request b from the link list of the physical channel 32 ((2) in FIG. 11).

Specifically, the request management unit 141 changes the head pointer 610 of the 1st virtual channel 33-1 indicating the entry 611 of the request b so that the head pointer 610 indicates the entry 612 of the subsequent request d of the entry 611 of the request b. Accordingly, the entry 611 of the request b is deleted from the link list of the 1st virtual channel 33-1.

The request management unit 141 specifies a storage position of the entry 52 of the request b in the physical channel 32 using the entry 611 of the request b in the 1st virtual channel 33-1. As illustrated in FIG. 9, in the request field 611R of the entry 611, a pointer indicating the entry 52 in the physical channel 32 in which the request b itself is stored is stored. Therefore, the request management unit 141 specifies the storage position of the entry 52 of the request b in the physical channel 32 using the pointer stored in the request field 611R. The request management unit 141 specifies that the pointer indicating the entry 52 of the specified request b is stored in the pointer field 51P of the entry 51 of the request a in the physical channel 32. The request management unit 141 changes the pointer stored in the pointer field 51P to a pointer indicating the entry 53 of the subsequent request c of the entry 52 of the request b. Accordingly, the entry 52 of the request b is deleted from the link list of the physical channel 32. For example, when the physical channel is implemented with a bidirectional list, it is possible to obtain the advantage of shortening the time related to a physical channel deletion operation of FIG. 11.

In this way, the request management unit 141 implements the dequeue operation of deleting the request b from the 1st virtual channel 33-1 and deleting the request b from the physical channel 32 by an operation of deleting the entry 611 of the request b from the link list of the 1st virtual channel 33-1 and deleting the entry 52 of the request b from the link list of the physical channel 32.

Figure 12:
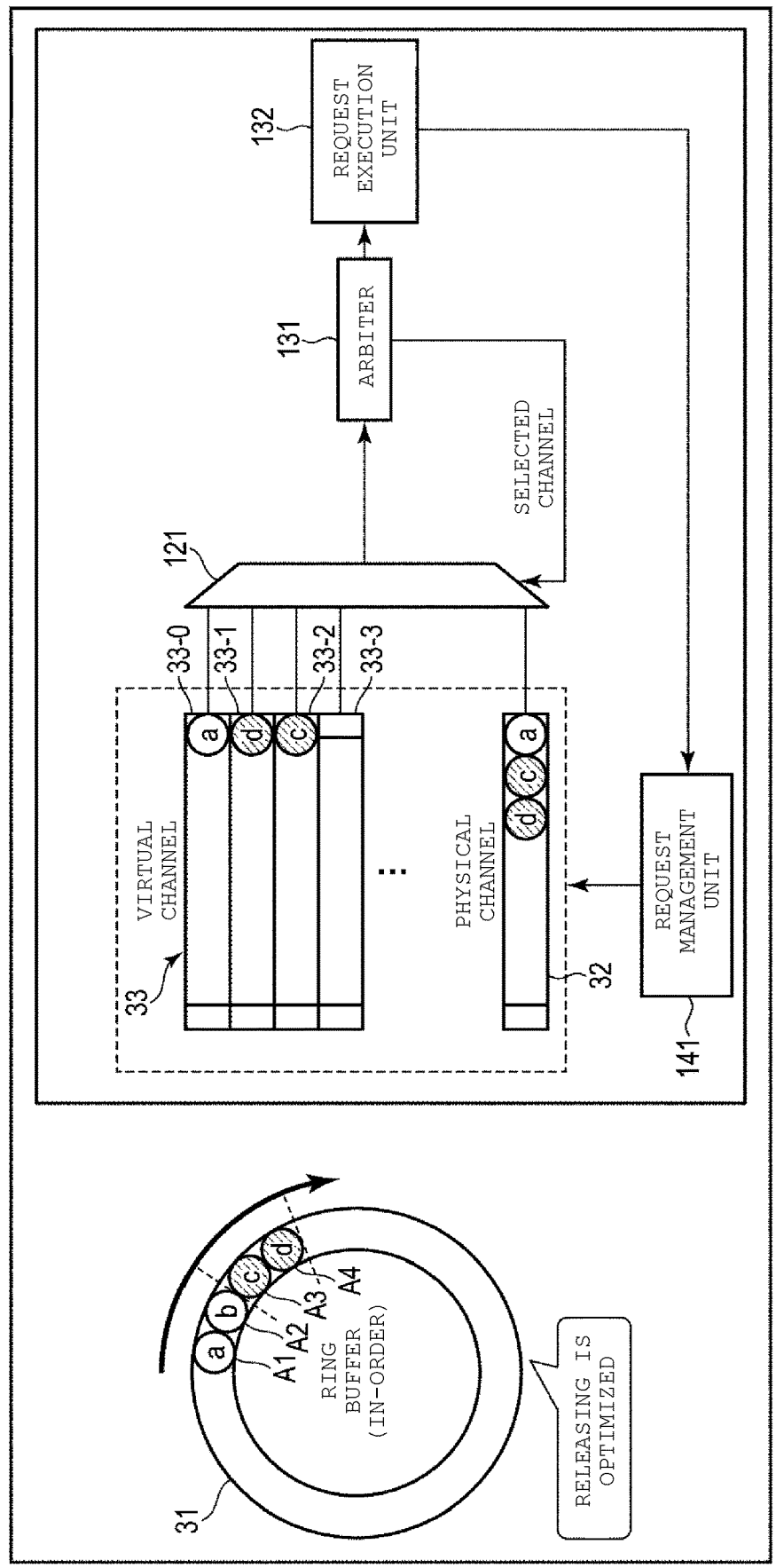
FIG. 12 is a diagram illustrating a second example of the dequeue operation in the memory system.

FIG. 12 is a diagram illustrating a second example of the dequeue operation. Here, a dequeue operation of further deleting the request a from the physical channel 32 and the virtual channel 33 after the dequeue operation illustrated in FIG. 10 will be exemplified. When the degree of flexibility of the parallel process management is equal to or greater than the threshold, the dequeue operation is executed after the arbiter 131 acquires the request a from the head of the physical channel 32 and the request execution unit 132 executes a process in response to the request a. When the degree of flexibility of the parallel process management is equal to or greater than the threshold, latency of a response to the request and the releasing of resources are optimized by the in-order process of the request that follows the original request order.

The dequeue operation of deleting the request a includes an operation of deleting the request a from the physical channel 32 and an operation of deleting the request a from the 0th virtual channel 33-0. The request a is deleted from the head of the 0th virtual channel 33-0. The request a is deleted from the head of the physical channel 32.

In the ring buffer 31, the storage region A1 corresponding to the request a is released.

Figure 13:
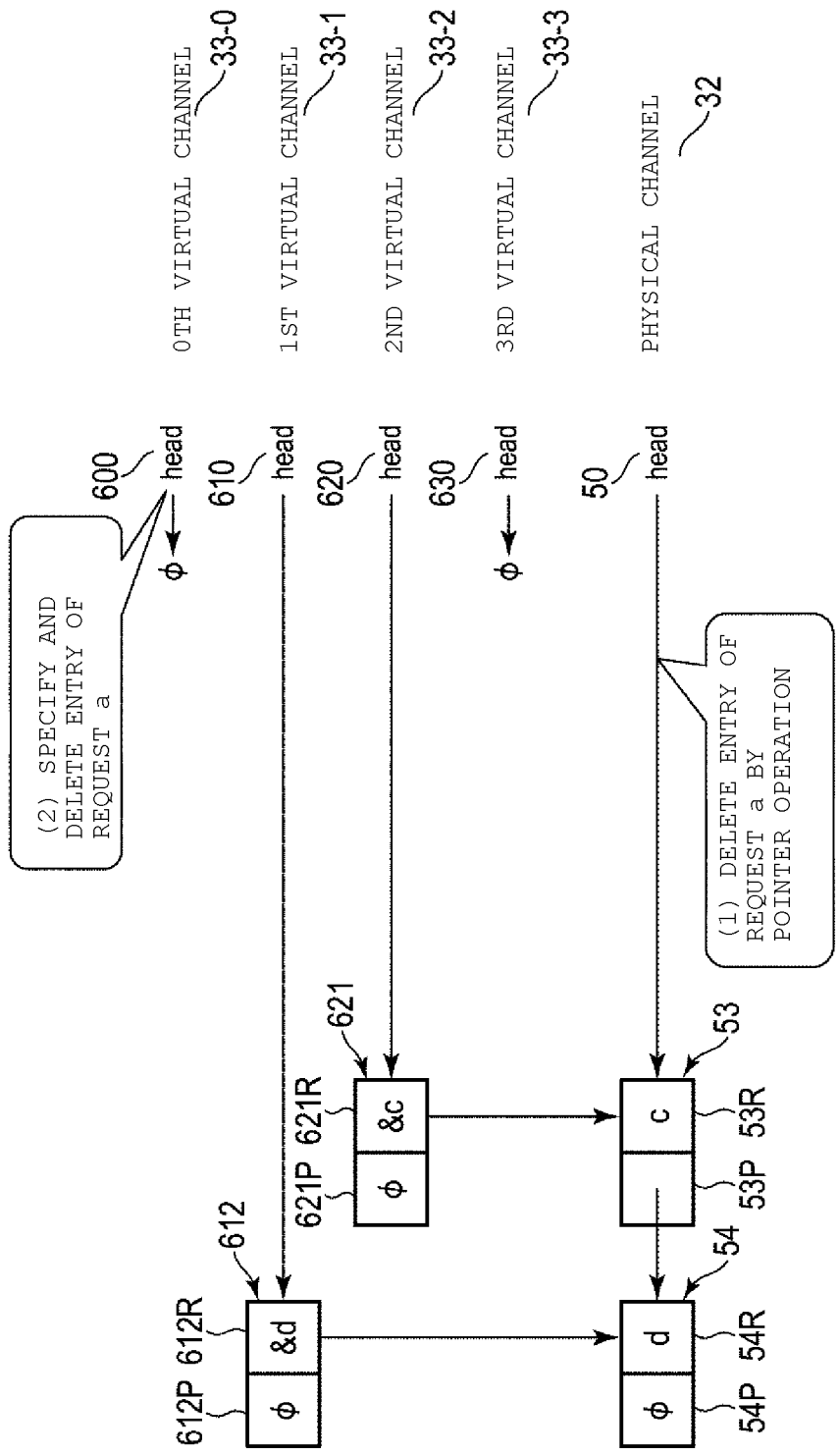
FIG. 13 is a diagram illustrating a link list updated in the dequeue operation in FIG. 12.

FIG. 13 is a diagram illustrating link lists for implementing the physical channels 32 and the virtual channels 33 in FIG. 12.

In the second example of the dequeue operation, the request management unit 141 deletes the entry 51 of the request a from the link list of the physical channel 32 ((1) in FIG. 13) and deletes the entry 601 of the request a from the link list of the 0th virtual channel 33-0 ((2) in FIG. 13).

Specifically, the request management unit 141 changes the head pointer 50 of the physical channel 32 indicated the entry 51 of the request a so that the entry 53 of the subsequent request c of the entry 51 of the request a is indicated. Accordingly, the entry 51 of the request a is deleted from the link list of the physical channel 32.

Subsequently, the request management unit 141 specifies the 0th virtual channel 33-0 to which the request is assigned based on the process corresponding to the request a. It is guaranteed that the request a stored in the head of the physical channel 32 is stored in the head in the 0th virtual channel 33-0. Therefore, the request management unit 141 specifies the entry 601 of the request a in the head of the 0th virtual channel 33-0 using the head pointer 600 of the 0th virtual channel 33-0. Since there is no entry subsequent to the entry 601 of the specified request a, the request management unit 141 changes the the head pointer 600 so that the head pointer 600 of the 0th virtual channel 33-0 does not indicate any entry. For example, the request management unit 141 sets the head pointer 600 of the 0th virtual channel 33-0 to null. Accordingly, the entry 601 of the request a is deleted from the link list of the 0th virtual channel 33-0.

In this way, the request management unit 141 can implement the dequeue operation of deleting the request a from the physical channel 32 and deleting the request a from the 0th virtual channel 33-0 by an operating of deleting the entry 51 of the request a from the link list of the physical channel 32 and deleting the entry 601 of the request a from the link list of the 0th virtual channel 33-0.

Next, an operation from arbitration to dequeue (hereinafter referred to as an arbitration-dequeue operation) when the degree of flexibility of the parallel process management is less than the threshold and there are a plurality of executable processes will be described. When the degree of flexibility of the parallel process management is less than the threshold and there are the plurality of executable processes, the arbiter 131, for example, acquires an earlier request in the original request order among the requests stored in the plurality of virtual channels 33 respectively corresponding to the plurality of processes. This is implemented, for example, by causing the arbiter 131 to search for the physical channel 32 in order from the head and search for the requests corresponding to the executable processes.

Figure 14:
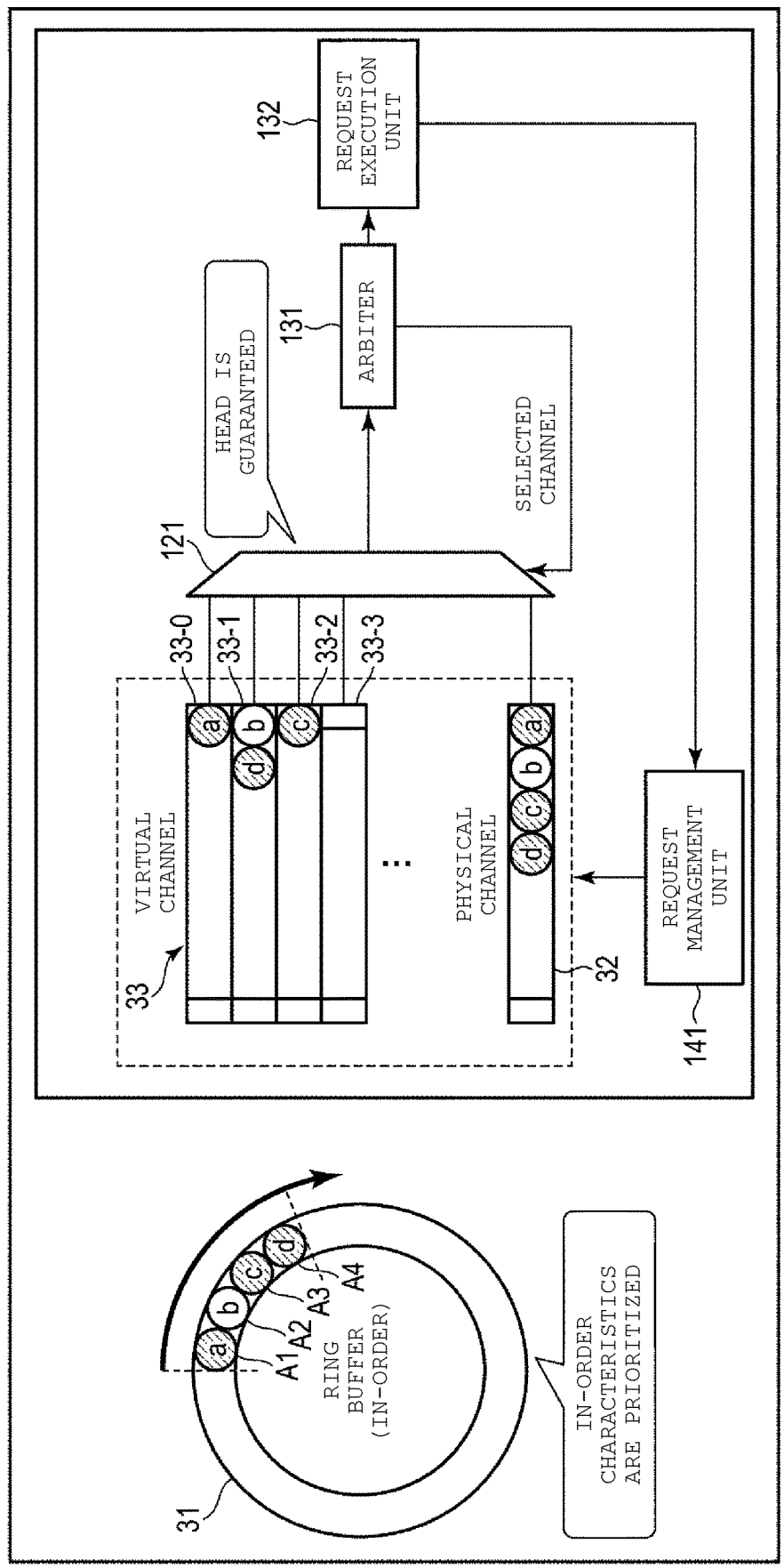
FIG. 14 is a diagram illustrating an example of an arbitration operation to dequeue when the degree of flexibility of the parallel process is less than the threshold and there are a plurality of executable processes in the memory system.

FIG. 14 is a diagram illustrating an example of an arbitration-dequeue operation. Here, it is assumed that the requests are acquired from the physical channel 32 and the virtual channels 33 after the enqueue operation illustrated in FIG. 8 when the degree of flexibility of the parallel process management is less than the threshold and the processes corresponding to the odd virtual channels 33 (that is, the 1st virtual channel 33-1 and the 3rd virtual channel 33-3) are executable. The processes corresponding to the even virtual channels 33 (that is, the 0th virtual channel 33-0 and the 2nd virtual channel 33-2) are not executable. The processes corresponding to the odd virtual channels 33 are also referred to as odd processes.

First, the arbiter 131 searches for the physical channel 32 from the head and specifies a first request corresponding to the odd process. In the example illustrated in FIG. 14, the arbiter 131 specifies the request b corresponding to the first process in the physical channel 32. The arbiter 131 acquires the specified request b from the physical channel 32 and transmits the request b to the request execution unit 132. The request b is stored in the head of the 1st virtual channel 33-1 corresponding to the first process. That is, it is guaranteed that the first request b searched for and specified in order from the head of the physical channel 32 is stored in the head of the corresponding 1st virtual channel 33-1. Accordingly, the fact that the arbiter 131 searches for the physical channel 32 from the head and acquires the first request corresponding to the odd executable process corresponds to the fact that the request is acquired from the head of any virtual channel 33 corresponding to the executable process in consideration of the original request order.

The request execution unit 132 executes a process in response to the request b received from the arbiter 131. For example, the request execution unit 132 notifies the request management unit 141 of completion of the process in response to the request b.

The request management unit 141 executes the dequeue operation of deleting the corresponding request from both the physical channel 32 and the 1st virtual channel 33-1 in response to the notification by the request execution unit 132. The request management unit 141 releases the storage region A2 corresponding to the request b in the ring buffer 31 according to the completion of the process in response to the request b.

In this way, the arbiter 131 can search for the physical channel 32 from the head and acquire the first request corresponding to the executable process. That is, when the degree of flexibility of the parallel process management is less than the threshold and there are the plurality of executable processes corresponding to the odd virtual channels 33, the arbiter 131 can acquire an earlier request in the original request order among the requests stored in the plurality of virtual channels 33 corresponding to the plurality of processes. Accordingly, even when the degree of flexibility of the parallel process management is less than the threshold, the process in response to the earlier request in the original request order is preferentially executed. Therefore, it is possible to improve usage efficiency of resources (for example, the ring buffer 31) in which the in-order process is assumed.

Figure 15:
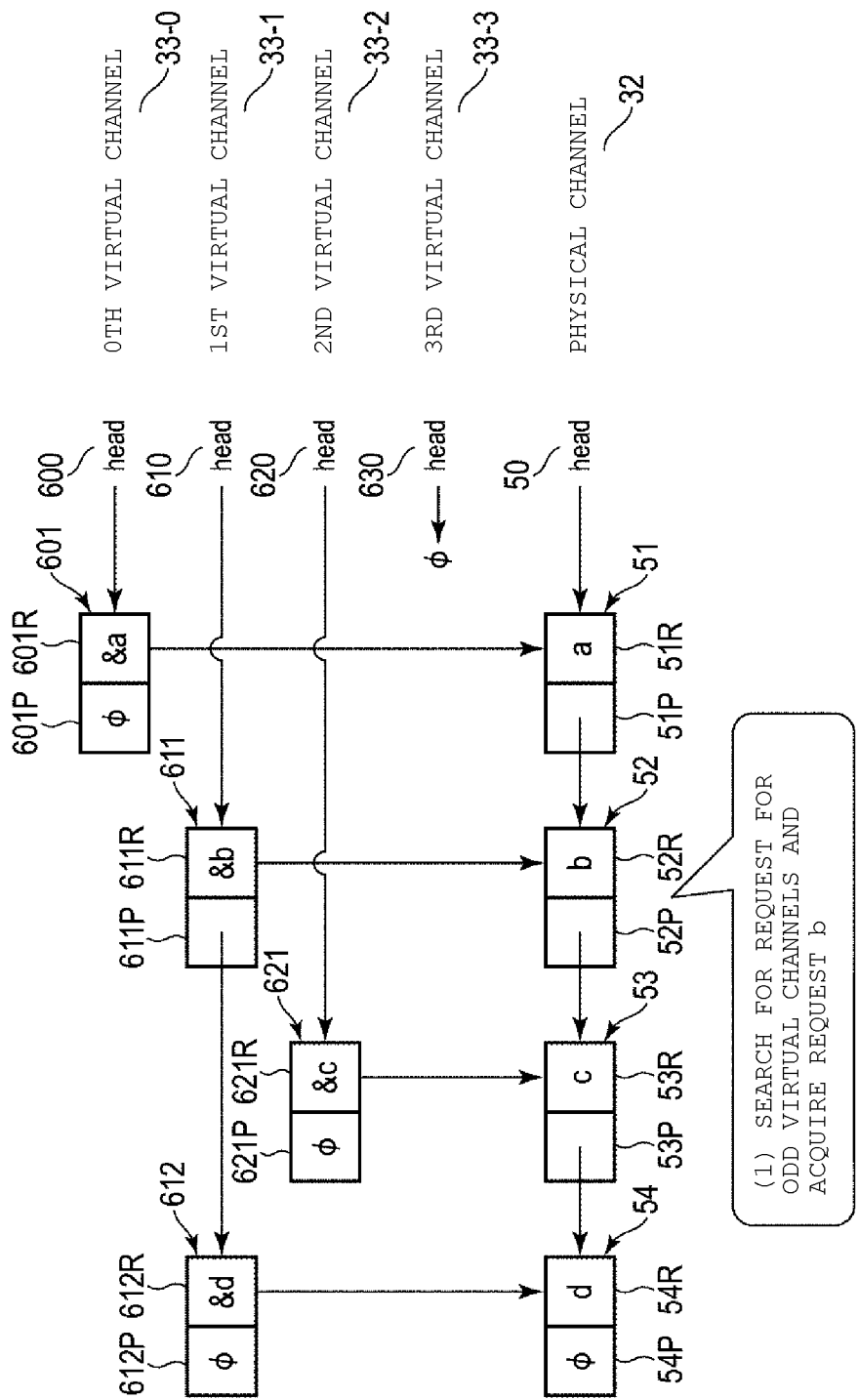
FIG. 15 is a diagram illustrating an example of a link list in the arbitration operation in FIG. 14.

FIG. 15 is a diagram illustrating an example of link lists for implementing the physical channels 32 and the virtual channels 33 in FIG. 14.

In the arbitration-dequeue operation, the arbiter 131 first searches for the entries 51, 52, 53, and 54 from the head in order based on the head pointer 50 of the link list of the physical channel 32 and specifies the request b virtually stored in the 1st virtual channel 33-1 (that is, the first request b corresponding to the executable process) from the entry 52 ((1) in FIG. 15). The arbiter 131 acquires the specified request b from the entry 52 of the physical channel 32 and transmits the request b to the request execution unit 132.

Then, the request management unit 141 deletes the request b from both the physical channel 32 and the 1st virtual channel 33-1.

Figure 16:
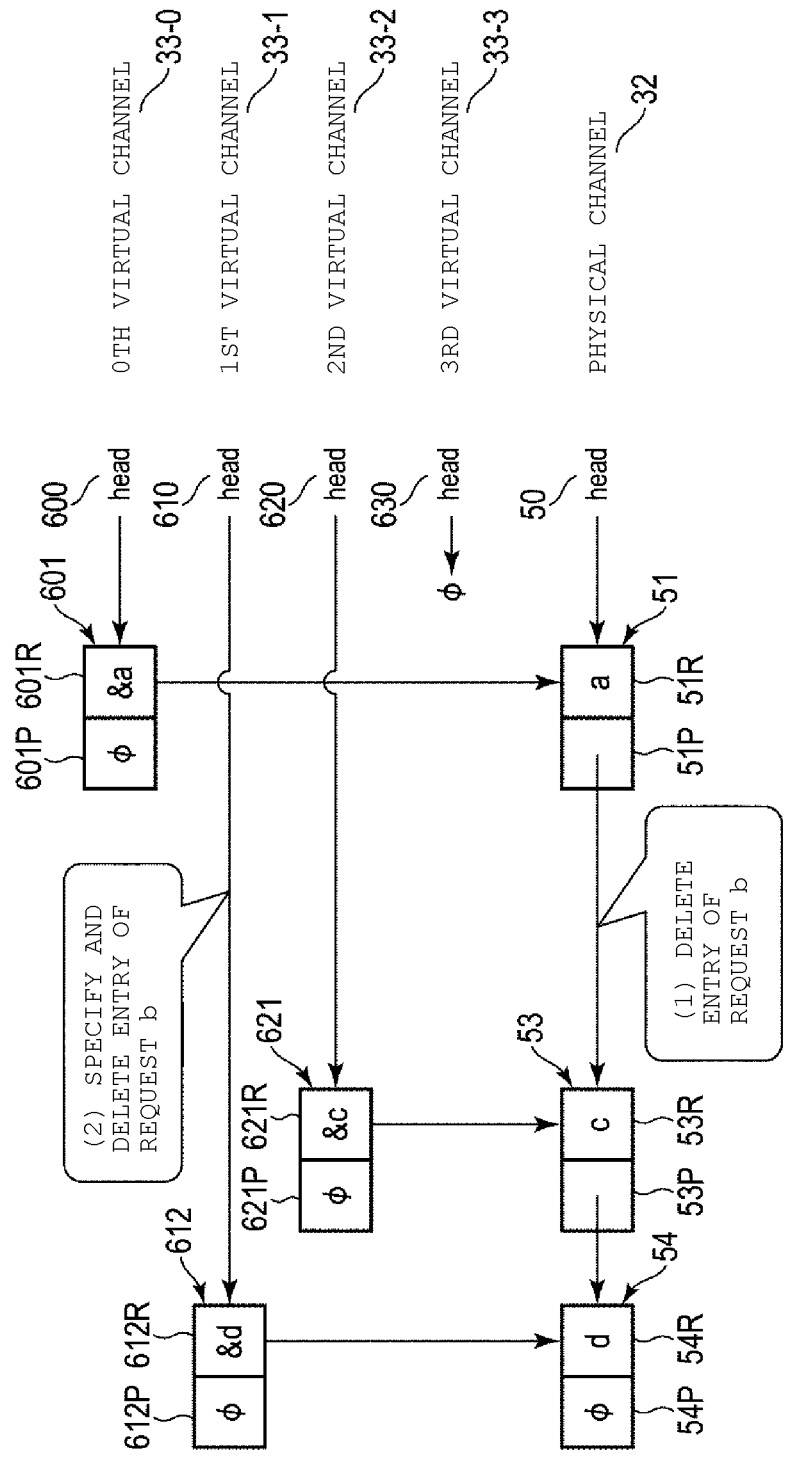
FIG. 16 is a diagram illustrating an example of a link list in the dequeue operation in FIG. 14.

FIG. 16 illustrates an example in which the request b is deleted from the link lists of the physical channels 32 and the virtual channels 33 illustrated in FIG. 15.

The request management unit 141 deletes the entry 52 of the request b from the link list of the physical channel 32 ((1) in FIG. 16) and deletes the entry 611 of the request b from the link list of the 1st virtual channel 33-1 ((2) in FIG. 16).

Specifically, the request management unit 141 changes the pointer indicating the entry 52 of the request b in the pointer field 51P of the request a so that the pointer indicates the entry 53 of the subsequent request c of the entry 52 of the request b. Accordingly, the entry 52 of the request b is deleted from the link list of the physical channel 32.

Subsequently, the request management unit 141 specifies the 1st virtual channel 33-1 to which the request b is assigned based on the first process corresponding to the request b. It is guaranteed that the request b searched for in order from the head of the physical channel 32 is stored in the head in the 1st virtual channel 33-1. Therefore, the request management unit 141 specifies the entry 611 of the request b in the head of the 1st virtual channel 33-1 using the head pointer 610 of the 1st virtual channel 33-1. The request management unit 141 changes the head pointer 610 of the 1st virtual channel 33-1 so that the head pointer 610 indicates the entry 612 of the subsequent request d of the entry 611 of the specified request b. Accordingly, the entry 611 of the request b is deleted from the link list of the 1st virtual channel 33-1.

In this way, the request management unit 141 implements the dequeue operation of deleting the request b from the physical channel 32 and deleting the request b from the 1st virtual channel 33-1 by an operation of deleting the entry 52 of the request b from the link list of the physical channel 32 and deleting the entry 611 of the request b from the link list of the 1st virtual channel 33-1.

As described above, according to the embodiment, it is possible to improve the efficiency of the process.

The plurality of memory chips 41 are capable of operating in parallel. The SRAM 12 includes the physical channel 32 capable of storing the requests issued from the host 2 in storage order and the plurality of virtual channels 33 capable of storing the requests issued from the host 2 in storage order. The request management unit 141 stores one or more requests issued from the host 2 in the physical channel 32 in the order of acquisition from the host 2. The request management unit 141 stores each of the one or more requests in one of the plurality of virtual channels 33. Each of the plurality of virtual channels 33 corresponds to one of a plurality of processes executed on the plurality of memory chips 41 in response to the one or more requests.

When the degree of flexibility of the parallel process management is equal to or greater than the threshold, the arbiter 131 and the request execution unit 132 execute processes using the physical channel 32. More specifically, for example, the arbiter 131 acquires the first request among the one or more requests stored in the head of the physical channel 32. The request execution unit 132 executes the process in response to the first request. Thereafter, the request management unit 141 deletes the first request stored in the physical channel 32 and deletes the first request stored in the first virtual channel among the plurality of virtual channels 33. Accordingly, according to the in-order process of the request that follows the original request order, it is possible to shorten latency of a response to the request and improve usage efficiency of resources.

When the degree of flexibility of the parallel process management is less than the threshold, the arbiter 131 and the request execution unit 132 executes processes using the plurality of virtual channels 33. More specifically, the arbiter 131 acquires the second request among the one or more requests stored in the head of the second virtual channels 33 among the plurality of virtual channels 33. The request execution unit 132 executes the process in response to the second request. Thereafter, the request management unit 141 deletes the second request stored in the second virtual channel 33 and deletes the second request stored in the physical channel 32. Accordingly, it is possible to improve operation performance of all the plurality of memory chips 41.

Accordingly, in the memory system 3, by selectively using the physical channel 32 and the virtual channels 33 according to the degree of flexibility of the parallel process management, it is possible to improve efficiency of a process in the memory system 3.

Each of various functions described in the embodiment may be implemented by a circuit (processing circuit). Examples of the processing circuit include a programmed processor such as a central processing unit (CPU). The processor executes each of the described functions by executing a computer program (command group) stored in a memory. The processor may be a microprocessor including an electric circuit. Examples of the processing circuit include a digital signal processor (DSP), an application specific integrated circuit (ASIC), a microcontroller, a controller, and other electric circuit components. Each of other components other than the CPU described in the embodiment may also be implemented by the processing circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a plurality of memory chips capable of operating in parallel;
   a random access memory including a physical channel region in which requests issued from a host are stored and a plurality of virtual channel regions, each of which corresponds to one of a plurality of processes executed on the plurality of memory chips according to the one or more requests; and
   a controller configured to store the requests issued from the host in the physical channel region in order of acquisition from the host and to store an entry for each of the requests in one of the plurality of virtual channel regions, wherein
   when a required degree of parallelism of the plurality of processes is less than a predetermined threshold, the controller selects a next request to be executed, using the physical channel region, and
   when the required degree of parallelism is greater than or equal to the predetermined threshold, the controller selects the next request to be executed, using one of the plurality of virtual channel regions.

2. The memory system according to claim 1, wherein when the required degree of parallelism of the plurality of processes is less than the predetermined threshold, the controller selects a first request among the one or more requests stored in the head of the physical channel region and executes a process according to the first request, and upon completion of the process, deletes the first request stored in the physical channel region and deletes an entry stored in one of the plurality of virtual channel regions that corresponds to the first request.

3. The memory system according to claim 1, wherein when the required degree of parallelism is greater than or equal to the predetermined threshold, the controller accesses a first entry among the one or more entries stored in one of the plurality of virtual channel regions and executes a process according to a second request that corresponds to the first entry, and is stored in the physical channel region, and upon completion of the process, deletes the first entry stored in said one of the plurality of virtual channel regions and deletes the second request stored in the physical channel region.

4. The memory system according to claim 3, wherein the first entry includes a pointer that references the second request stored in the physical channel region.

5. The memory system according to claim 1, wherein multiple entries stored in any one of the plurality of virtual channel regions are stored in the order of acquisition of the corresponding requests from the host.

6. The memory system according to claim 1, wherein the required degree of parallelism decreases as the number of parallel processes that can be executed on the memory chips increases, and increases as the number of parallel processes that can be executed on the memory chips decreases.

7. A memory system comprising:
a plurality of memory chips capable of operating in parallel;
a random access memory including a physical channel region in which requests issued from a host are stored and a plurality of virtual channel regions, each of which corresponds to one of a plurality of processes executed on the plurality of memory chips according to the one or more requests; and
a controller configured to store the requests issued from the host in the physical channel region in order of acquisition from the host and to store an entry for each of the requests in one of the plurality of virtual channel regions, wherein
when a required degree of parallelism of the plurality of processes is less than a predetermined threshold, the controller selects a first request among the one or more requests stored at the head of the physical channel region and executes a first process according to the first request, and upon completion of the first process, deletes the first request stored in the physical channel region and deletes an entry stored in one of the plurality of virtual channel regions, and
when the required degree of parallelism is greater than or equal to the predetermined threshold, the controller accesses a first entry stored at the head of one of the plurality of virtual channel regions and executes a second process according to a second request that corresponds to the first entry, and is stored in the physical channel region, and upon completion of the second process, deletes the first entry stored in said one of the plurality of virtual channel regions and deletes the second request stored in the physical channel region.

8. The memory system according to claim 7, wherein each of the entries stored in the plurality of virtual channel regions includes a pointer that references a corresponding request stored in the physical channel region.

9. The memory system according to claim 8, wherein when the required degree of parallelism is greater than or equal to the predetermined threshold, the first entry is accessed from the head of one of the plurality of virtual channel regions corresponding to one of the plurality of processes that are executable.

10. The memory system according to claim 9, wherein the first entry references a request in the physical channel region that is closest to the head of the physical channel region than all other requests in the physical channel region that are referenced by entries in other virtual channel regions corresponding to the processes that are executable.

11. The memory system according to claim 8, wherein when a third request is acquired from the host, the controller stores the third request at the tail of the physical channel region, determines a process corresponding to the third request, and stores an entry corresponding to the third request at the tail of a virtual channel region among the plurality of virtual channel regions that correspond to the determined process.

12. The memory system according to claim 7, wherein the required degree of parallelism decreases as the number of parallel processes being executed on the memory chips increases, and increases as the number of parallel processes being executed on the memory chips decreases.

13. A method of executing processes according to requests from a host in a memory system communicating with the host, wherein the memory system includes a plurality of memory chips capable of operating in parallel, a random access memory including a physical channel region in which requests issued from the host are stored and a plurality of virtual channel regions, each of which corresponds to one of a plurality of processes executed on the plurality of memory chips according to the one or more requests, and a controller configured to store the requests issued from the host in the physical channel region in order of acquisition from the host and to store an entry for each of the requests in one of the plurality of virtual channel regions, said method comprising:
determining a required degree of parallelism of the plurality of processes;
in response to determining that the required degree of parallelism is less than a predetermined threshold, selecting a next request to be executed, using the physical channel region; and
in response to determining that the required degree of parallelism is greater than or equal to the predetermined threshold, selecting the next request to be executed, using one of the plurality of virtual channel regions.

14. The method according to claim 13, further comprising:
in response to determining that the required degree of parallelism of the plurality of processes is less than the predetermined threshold, selecting a first request among the one or more requests stored in the head of the physical channel region and executing a process according to the first request, and upon completion of the process, deleting the first request stored in the physical channel region and deleting an entry stored in one of the plurality of virtual channel regions that corresponds to the first request.

15. The method according to claim 13, wherein
in response to determining that the required degree of parallelism is greater than or equal to the predetermined threshold, accessing a first entry among the one or more entries stored in one of the plurality of virtual channel regions and executing a process according to a second request that corresponds to the first entry, and is stored in the physical channel region, and upon completion of the process, deleting the first entry stored in said one of the plurality of virtual channel regions and deleting the second request stored in the physical channel region.

16. The method according to claim 15, wherein the first entry includes a pointer that references the second request stored in the physical channel region.

17. The method according to claim 13, wherein multiple entries stored in any one of the plurality of virtual channel regions are stored in the order of acquisition of the corresponding requests from the host.

18. The method according to claim 13, wherein the required degree of parallelism decreases as the number of parallel processes being executed on the memory chips increases, and increases as the number of parallel processes being executed on the memory chips decreases.

* * * * *